United States Patent
Nakajima et al.

(10) Patent No.: US 9,588,300 B2
(45) Date of Patent: Mar. 7, 2017

(54) OPTICAL INPUT/OUTPUT DEVICE

(71) Applicant: NIPPON TELEGRAPH AND TELEPHONE CORPORATION, Tokyo (JP)

(72) Inventors: Mitsumasa Nakajima, Atsugi (JP); Keita Yamaguchi, Atsugi (JP); Joji Yamaguchi, Atsugi (JP); Yuzo Ishii, Atsugi (JP); Koichi Hadama, Atsugi (JP); Naru Nemoto, Atsugi (JP); Etsu Hashimoto, Atsugi (JP); Kazunori Seno, Atsugi (JP); Kenya Suzuki, Atsugi (JP); Yoshito Jin, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 13 days.

(21) Appl. No.: 14/649,363

(22) PCT Filed: Dec. 6, 2013

(86) PCT No.: PCT/JP2013/007214
§ 371 (c)(1),
(2) Date: Jun. 3, 2015

(87) PCT Pub. No.: WO2014/087673
PCT Pub. Date: Jun. 12, 2014

(65) Prior Publication Data
US 2015/0316725 A1    Nov. 5, 2015

(30) Foreign Application Priority Data
Dec. 7, 2012   (JP) ................................ 2012-268663

(51) Int. Cl.
*G02B 6/26*   (2006.01)
*G02B 6/42*   (2006.01)
(Continued)

(52) U.S. Cl.
CPC ........ *G02B 6/3588* (2013.01); *G02B 6/3548* (2013.01); *G02B 6/3584* (2013.01);
(Continued)

(58) Field of Classification Search
None
See application file for complete search history.

(56) References Cited

U.S. PATENT DOCUMENTS 7,457,547 B2 * 11/2008 Frisken .............. G01M 11/0292
398/119
2005/0100277 A1    5/2005 Frisken
(Continued)

FOREIGN PATENT DOCUMENTS

CA     2766694      12/2010
JP     2002-090784   3/2002
(Continued)

OTHER PUBLICATIONS

Fujita, T; "Blazed Gratings and Fresnel Lenses Fabricated by Electron-beam Lithography." Department of Electronics, Osaka University; Optics Letters; vol. 7, No. 12; pp. 578-580; Dec. 1982.
(Continued)

*Primary Examiner* — Chad Smith
(74) *Attorney, Agent, or Firm* — Workman Nydegger

(57) ABSTRACT

An optical input/output device includes a phase modulator element and an optical element. The phase modulator element includes a plurality of pixels arranged in a matrix and is configured to change an optical phase of signal light by applying a driving signal corresponding to a phase pattern. The optical element is configured to convert a direction of exit of the signal light so as to irradiate each pixel with the signal light from the input port. A pattern generator unit includes superimposing means for superimposing a periodic phase pattern having a predetermined period in at least one
(Continued)

direction in a plane of the phase modulator element, and means for controlling an amplitude of the periodic phase pattern. The signal light is diffracted to a position according to the period of the superimposed periodic phase pattern, so that light intensity of the signal light is dispersed.

6 Claims, 23 Drawing Sheets

(51) Int. Cl.
*G02B 6/35* (2006.01)
*G02F 1/31* (2006.01)
*G02F 1/139* (2006.01)

(52) U.S. Cl.
CPC .............. *G02B 6/356* (2013.01); *G02F 1/139* (2013.01); *G02F 1/31* (2013.01); *G02F 2203/50* (2013.01)

(56) References Cited

U.S. PATENT DOCUMENTS

| | | |
|---|---|---|
| 2006/0067611 A1 | 3/2006 | Frisken |
| 2006/0098156 A1 | 5/2006 | Frisken et al. |
| 2009/0052839 A1 | 2/2009 | Shimizu et al. |
| 2014/0016182 A1* | 1/2014 | Hotta .................... G02F 1/2955 359/320 |

FOREIGN PATENT DOCUMENTS

| | | |
|---|---|---|
| JP | 2007-510957 | 4/2007 |
| JP | 2008-519298 | 6/2008 |
| JP | 2009-036886 | 2/2009 |
| JP | 2009-047917 | 3/2009 |
| JP | 2012-530950 | 12/2012 |
| JP | 2014-021190 | 2/2014 |
| WO | 2012-165564 | 12/2012 |

OTHER PUBLICATIONS

Magnusson, R.; "Diffraction Efficiencies of Thin Phase Gratings with Arbitrary Grating Shape;" School of Electrical Engineering, Georgia Institute of Technology; vol. 68, No. 6; pp. 806-809; Jun. 1978.

International Preliminary Report on Patentability in corresponding Application No. PCT/JP2013/007214 dated Jun. 18, 2015.

International Preliminary Report on Patentability and Written Opinion in corresponding Application No. PCT/JP2013/007214 dated Jun. 18, 2015.

International Search Report in corresponding Application No. PCT/JP2013/007214 dated Mar. 4, 2014.

* cited by examiner

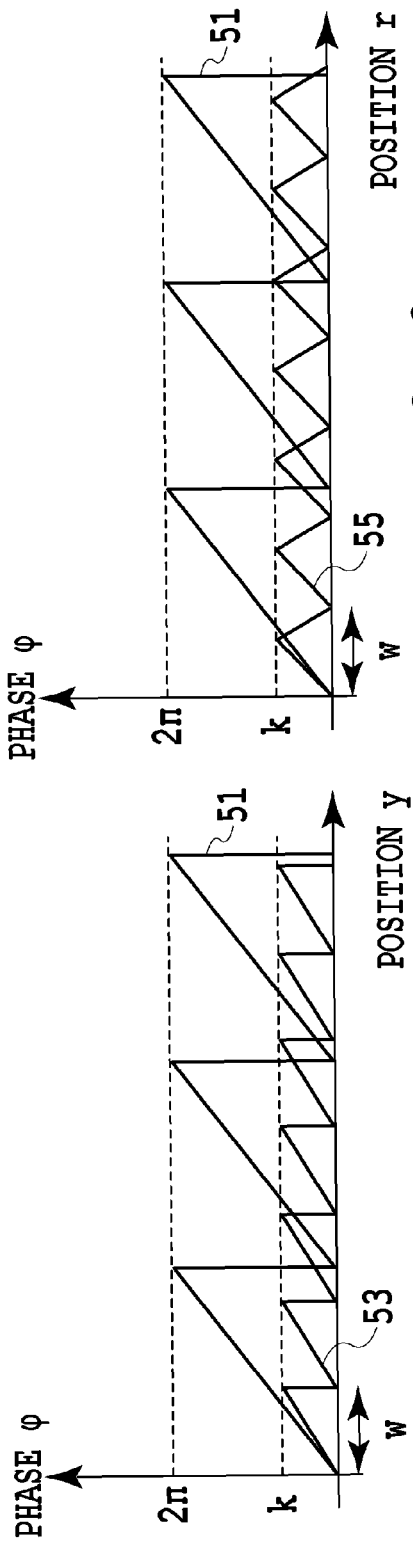
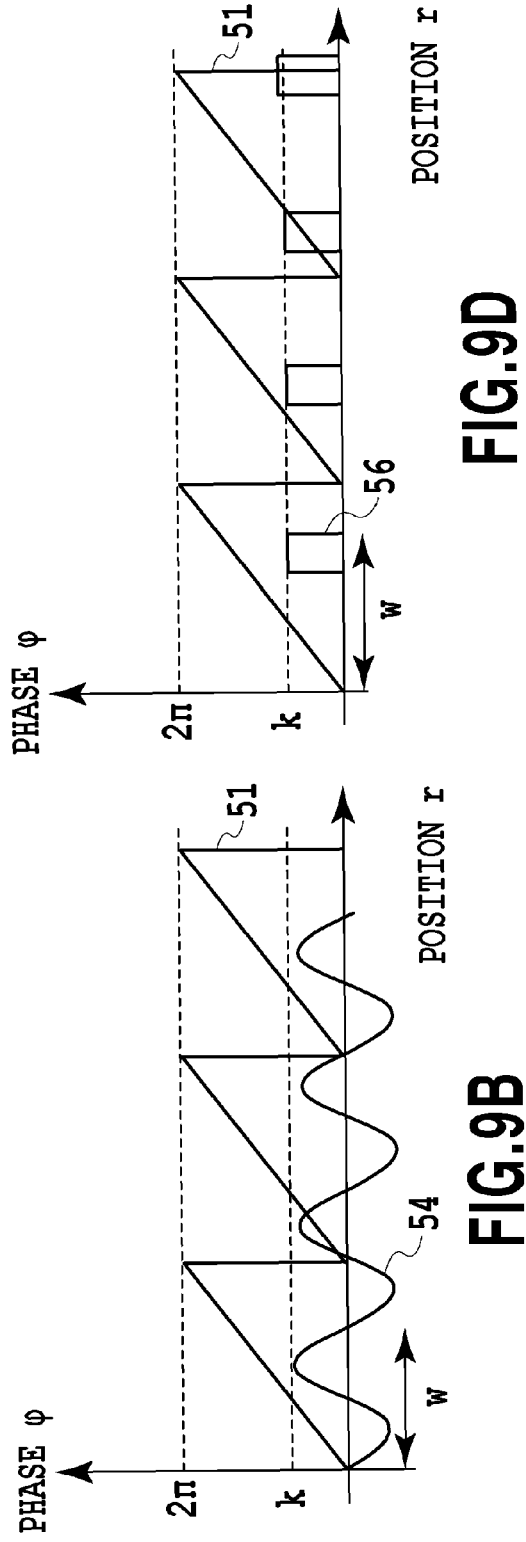

OPTICAL INPUT/OUTPUT DEVICE

TECHNICAL FIELD

The present invention relates to an optical input/output device for use in an optical network.

BACKGROUND ART

With increasing Internet traffic, there is an increasing need to increase communication capacity for optical communication. Technologies receiving attention as a routing function device for the optical communication include optical switches. Among the optical switches, a free-space optical switch for switching between paths of light in a free space is superior to other types from the viewpoint of high-density packaging or reduction in power consumption, and its technological development has recently advanced.

A basic configuration of the free-space optical switch will be described. Generally, the free-space optical switch is formed of several lenses and a light beam deflector element for changing a direction of travel of a light beam, which are provided in a free space between an input fiber and an output fiber. Typical optical switches include an optical crossconnect switch (OXC) formed of an input/output fiber array, a collimator lens array, and two sets of light beam deflector element arrays, and a wavelength selector switch (WSS) formed of an input/output fiber array, a collimator lens array, a lens group, a dispersion element, and a beam deflector element array.

The free-space optical switch can lay out a light beam at high density in a space but, on the other hand, does not have an optical waveguide structure formed of a fiber or the like and thus poses a problem of unintended leakage of light outside a target output port. In a case of an optical switch having a configuration including an arrangement of plural output ports, leakage of light at high power level into a proximity port or the like is a matter of technological development which needs particular care, due to the fact that such leakage causes crosstalk and hence leads to degradation in signal quality.

Functions of the optical switch include an optical attenuation function for controlling the light power of the output port. Although the optical attenuation function of the free-space optical switch may be achieved by an approach of individually mounting an optical attenuator in the following stage after each output port, this increases cost or size with an increasing number of ports. Therefore, a method using the light beam deflector element in the optical switch to implement the attenuation function is conceivable.

In a case where the light beam deflector element is used to implement the attenuation function, how the aforementioned crosstalk can be suppressed is a problem. Micro Electro Mechanical Systems (MEMS) or Liquid Crystal on Silicon Spatial Light Modulator (LCOS-SLM) is used as the light beam deflector element. Attenuation approaches include a method in which a phase is not returned with $2\pi$ as disclosed in Non-patent Literatures 1, 2, and a method in which a light beam is deflected at an angle intentionally offset from an optimum angle to the output port to control a light coupling rate, as disclosed in Patent Literature 1. However, this approach presents the problem of leakage of light to an adjacent output port causing crosstalk. Therefore, technical development in a novel attenuation approach is sought.

CITATION LIST

Patent Literature

PTL 1: Japanese Patent Laid-Open No. 2009-036886

Non Patent Literature

NPL 1: T. Fujita et al, Opt. Lett., 7 (1982) 578
NPL 2: R. Magnusson et al, J. Opt. Soc. Am. 68 (1978) 806

SUMMARY OF INVENTION

Technical Problem

For an optical input/output device, it is desirable that crosstalk to an adjacent port be low so as to avoid interference of signal light. However, the method using a phase modulator element such that a phase is not returned by an integer factor of $2\pi$ thereby to control light power as disclosed in Non-patent Literatures 1, 2 has difficulty in suppressing the crosstalk due to the occurrence of high-order light in the vicinity of the output port. Also, the method in which a deflection angle is changed to control light power as disclosed in Patent Literature 1 requires that ports be arranged at a distance greater than necessary, because of the occurrence of crosstalk to an adjacent port.

In order to solve the above-described problems, an object of the present invention is to provide a control approach for suppressing crosstalk to other ports in an optical communication network and changing output light power.

Solution to Problem

In order to solve the foregoing problems, the invention described in one embodiment provides an optical input/output device including: an input port and an output port configured to input and output signal light, respectively; a phase modulator element including plural pixels arranged in a matrix in a plane, a pattern generator unit configured to generate a phase pattern which is a combination of phase values set for each pixel to provide optical coupling to a desired port out of the input port and the output port, a control unit configured to convert the phase pattern into a driving signal for each pixel, and a driver unit configured to drive the pixel according to the driving signal, wherein the phase modulator element is configured to change an optical phase of the signal light entering each pixel, by the driver unit applying the driving signal corresponding to the phase pattern; and an optical element configured to convert a direction of exit of the signal light so as to irradiate each pixel in the plane of the phase modulator element with the signal light exiting from the input port to a space, wherein the pattern generator unit includes superimposing means for superimposing a periodic phase pattern having a predetermined period in at least one direction in the plane of the phase modulator element which the signal light enters, and means for controlling an amplitude of the periodic phase pattern, and wherein the signal light is diffracted to a position according to the period and pattern shape of the periodic phase pattern superimposed on the phase pattern capable of providing desired optical coupling between the input port and the output port, so that light intensity of the signal light is dispersed.

BRIEF DESCRIPTION OF DRAWINGS

FIG. 9A is a graph illustrating a first example of the superimposed periodic phase pattern;

FIG. 9B is a graph illustrating a second example of the superimposed periodic phase pattern;

FIG. 9C is a graph illustrating a third example of the superimposed periodic phase pattern;

FIG. 9D is a graph illustrating a fourth example of the superimposed periodic phase pattern;

DESCRIPTION OF EMBODIMENTS

Embodiments for carrying out the present invention will be described below with reference to the drawings.

[Configuration of First Optical Input/Output Device]

Figure 1:
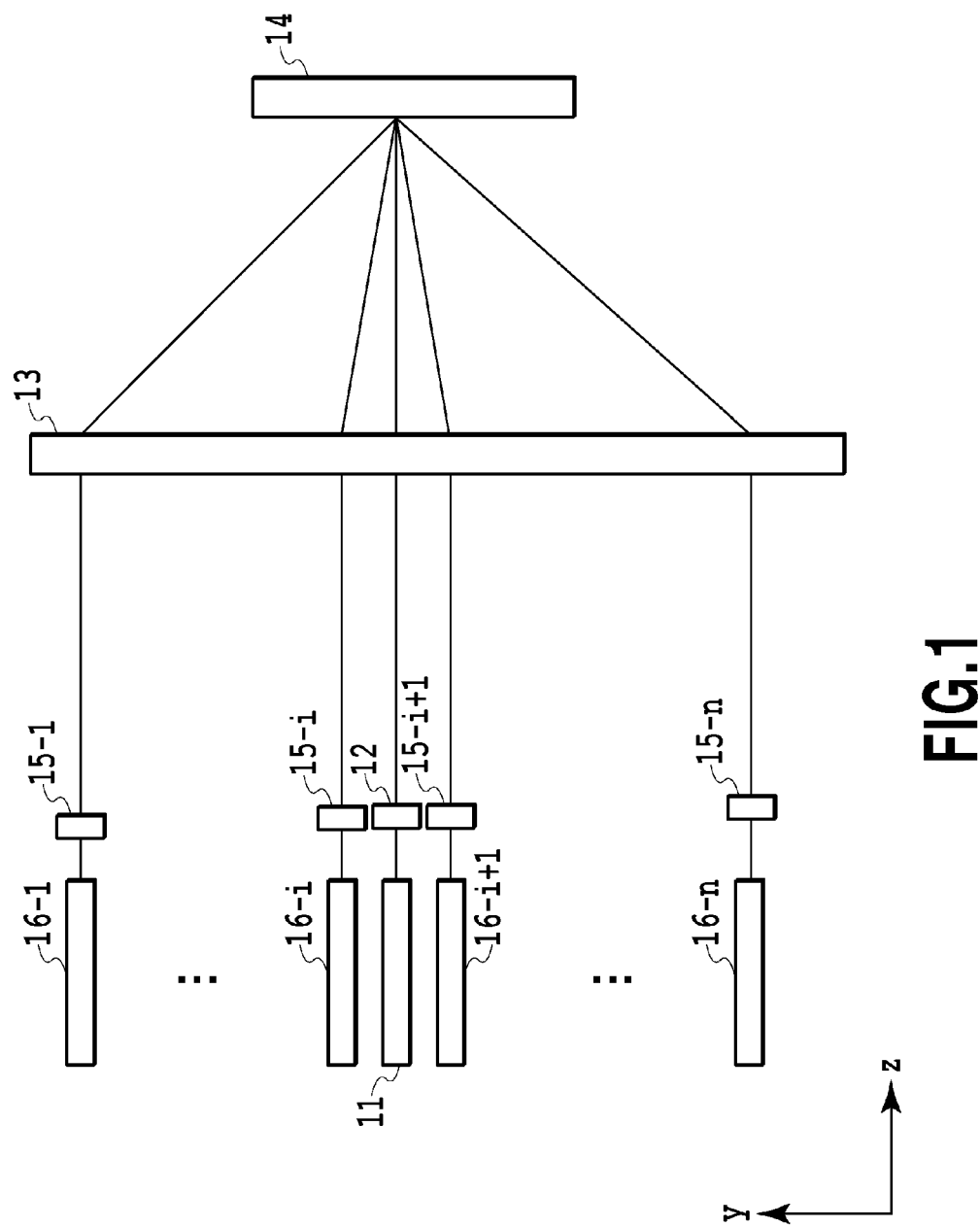
FIG. 1 is a diagram illustrating a configuration of an optical input/output device using a reflection type phase modulator element as an object to be controlled in the present invention, as viewed from a direction of an x axis.

Firstly, description will be given with regard to an optical input/output device using a phase modulator element as an object to be controlled in the present invention. FIG. 1 illustrates a configuration of an optical input/output device using a reflection type phase modulator element as an object to be controlled in the present invention, as viewed from a direction of an x axis. This is an example of a (1×n) switch with one input port and n output ports. Here, a direction of arrangement of the output ports is defined as a y axis, and a direction of propagation of signal light is defined as a z axis. The inputted signal light exits through an optical fiber 11 to a space and is provided through a collimator lens 12 to an optical element 13. Outgoing light as the signal light exiting from the optical element 13 is reflected by a phase modulator element 14 and is provided again through the optical element 13 to collimator lens arrays 12, 15-1 to 15-n and the optical fibers 11, 16-1 to 16-n. The signal light is outputted at an arbitrary attenuation level to an arbitrary output port for example in first to nth channels (specifically, paths formed of the optical element 13, the collimator lens arrays 12, 15-1 to 15-n, and the optical fibers 11, 16-1 to 16-n), by selecting a combination of an input port and an output port (hereinafter, the "input port and output port" will also be called an "input/output port") to be optically coupled by a phase pattern set in the phase modulator element 14, and an output light attenuation level.

As employed herein, the "phase" refers to a concept including a phase difference between light of light entering the phase modulator element 14 and light exiting the phase modulator element 14. Also, a phase exceeding 2π is equivalent to a result obtained by subtracting 2π from the phase. The light entering the phase modulator element 14 is given a phase according to an entry position in the phase modulator element 14. The "phase pattern" refers to a combination of phases independently set according to a position in the phase modulator element 14. A pencil of light which forms the signal light is reflected at a predetermined phase by each pixel of the phase modulator element 14, and the reflected pencil of light causes interference. As a result of the interference, optical coupling occurs between predetermined input and output ports at a predetermined attenuation level.

Means for converting a direction of exit of the signal light so as to cause incoming light to exit toward the phase modulator element 14 can be used as the optical element 13, and a lens, a prism, a diffraction grating, or the like, for example, can be used.

Figure 2:
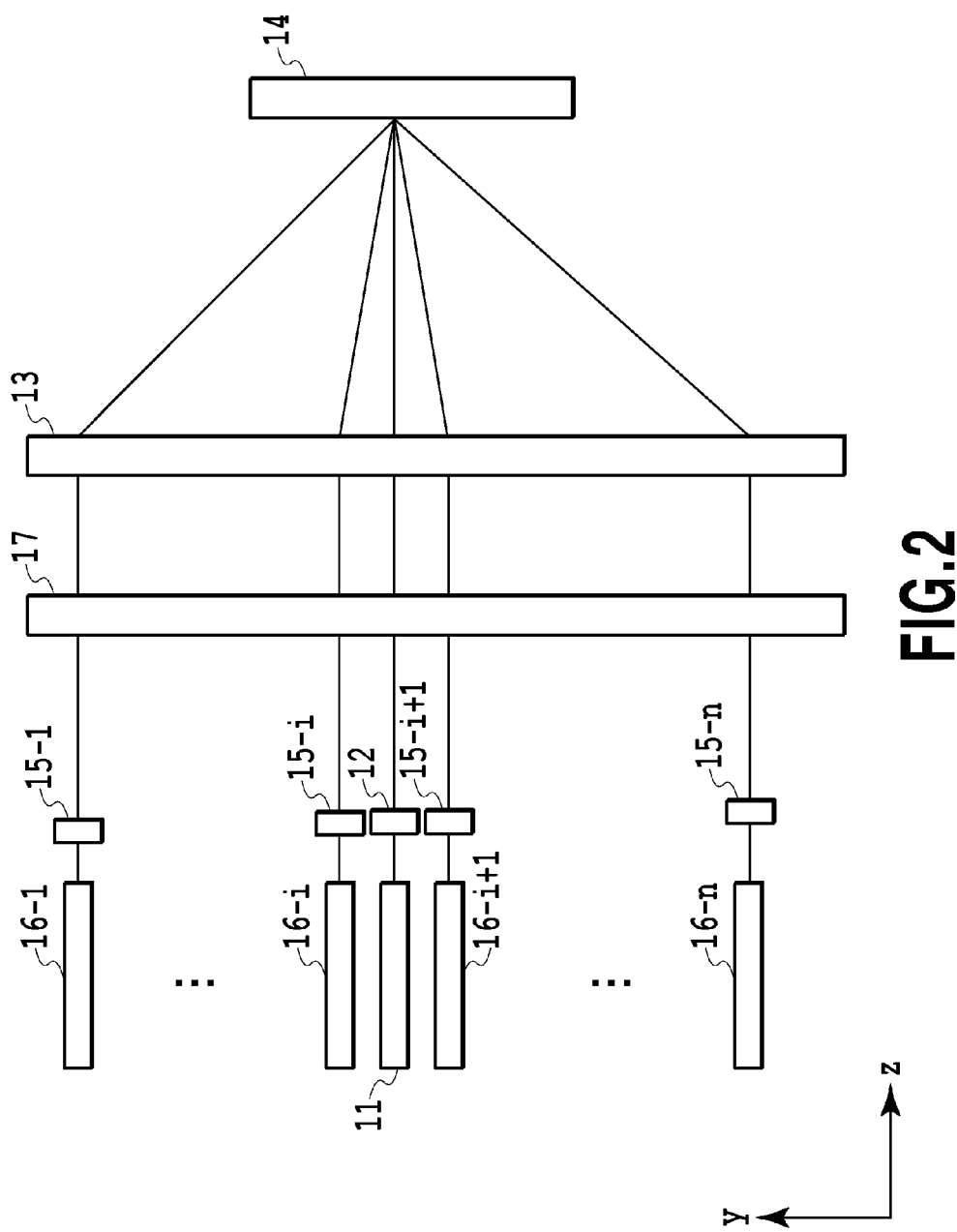
FIG. 2 is a diagram illustrating a configuration of an optical input/output device having wavelength selectivity, using a reflection type phase modulator element as an object to be controlled in the present invention, as viewed from the direction of the x axis.

Input signal light may be WDM (Wavelength Division Multiplexing) light which forms a bundle of wavelengths λp to λq, for example. Also, as illustrated in FIG. 2, a wavelength dispersion element 17 may be arranged between the collimator lenses 12, 15-1 to 15-n and the optical element 13 so as to vary a focusing position according to wavelength so that a combination of input/output ports or optical attenuation level, varying according to the wavelength, is selectable. In FIG. 2, the wavelength dispersion element may have performance of diffraction perpendicular to the paper as seen in FIG. 2 (or in the direction of the x axis) so as to apply light to a varying position in the phase modulator element 14 in a direction perpendicular to the paper according to the wavelength of the input signal light. The wavelength dispersion element 17 may be arranged between the optical element 13 and the phase modulator element 14.

In the configuration of the first input/output device, the example of the (1×n) switch is given; however, a configuration of an (n×1) switch with n input ports and one output port may be adopted, or a configuration of an (n×1) switch with n input ports and one output port may be adopted.

[Configuration of Second Optical Input/Output Device]

Figure 3:
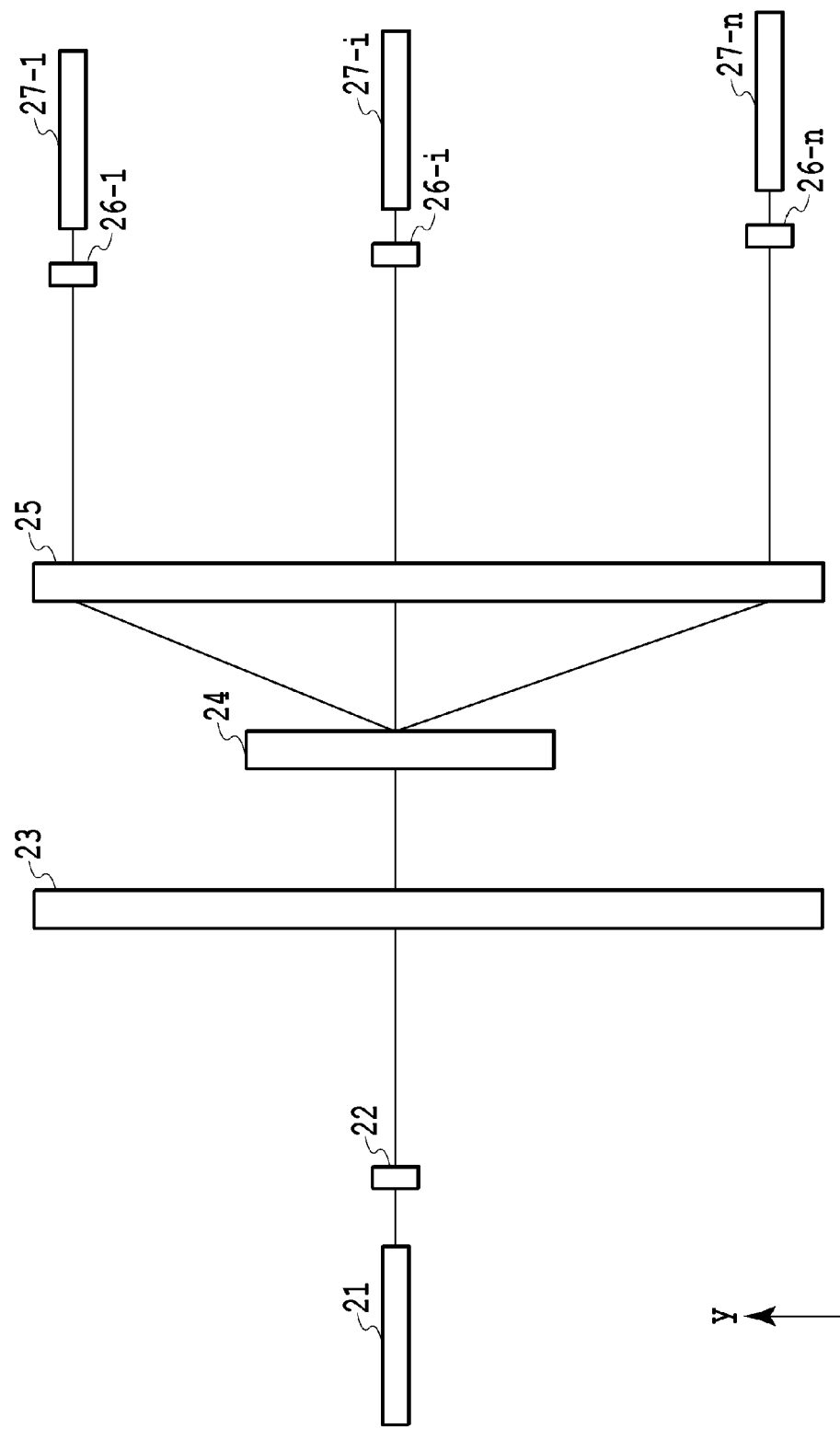
FIG. 3 is a diagram illustrating a configuration of an optical input/output device using a transmission type phase modulator element as an object to be controlled in the present invention, as viewed from the direction of the x axis.

Next, description will be given with regard to an example of a configuration of an optical input/output device using a transmission type phase modulator element. FIG. 3 illustrates a configuration of an optical input/output device using a reflection type phase modulator element as an object to be controlled in the present invention, as viewed from the direction of the x axis. This is an example of a (1×n) switch with one input port and n output ports. Input signal light exits through an optical fiber 21 to a space and enters through a collimator lens 22 into the first optical element 23. Outgoing light from the first optical element 23 is provided through a phase modulator element 24 and a second optical element 25 to collimator lens arrays 26-1 to 26-n and optical fibers 27-1 to 27-n. The signal light is outputted at an arbitrary light intensity to an arbitrary output port for example in the first to nth channels, by selecting a combination of input/output ports to be optically coupled by a phase pattern set in the phase modulator element 24, and an optical attenuation level.

Figure 4:
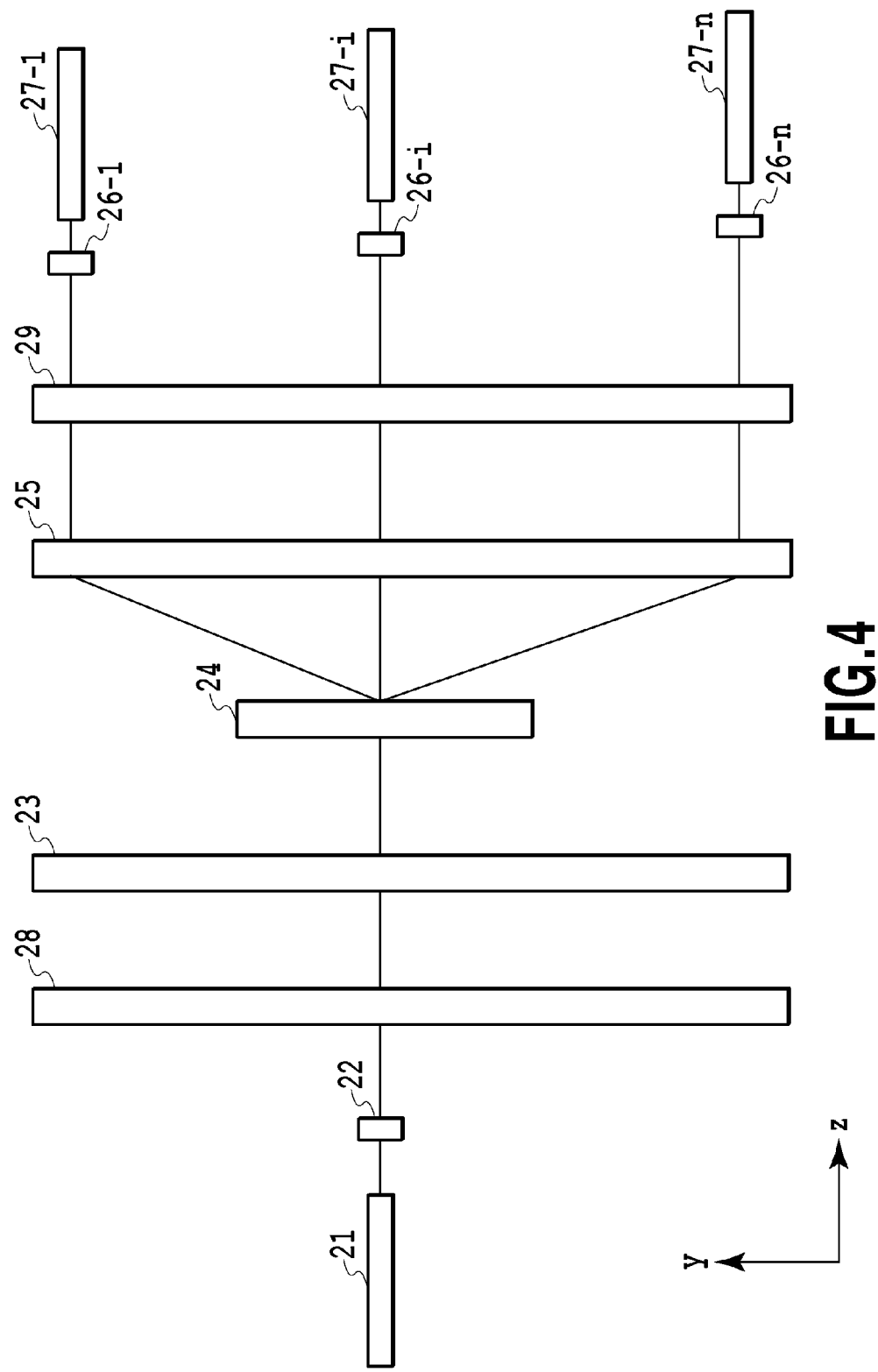
FIG. 4 is a diagram illustrating a configuration of an optical input/output device having wavelength selectivity, using a transmission type phase modulator element as an object to be controlled in the present invention, as viewed from the direction of the x axis.

Input signal light may be WDM (Wavelength Division Multiplexing) light which forms a bundle of wavelengths λp to λq, for example. Also, as illustrated in FIG. 4, a wavelength dispersion element 28 may be arranged between the collimator lens 22 and the optical element 23 and a wavelength dispersion element 29 may be arranged between the collimator lenses 26-1 to 26-n and the optical element 25, so as to vary a focusing position according to wavelengths so that a combination of input/output ports or optical attenuation level, varying according to the wavelength, is selectable. In FIG. 4, the wavelength dispersion element may have performance of diffraction perpendicular to the paper as seen in FIG. 4 (or in the direction of the x axis) so as to apply light to a varying position in the phase modulator element 24 in a direction perpendicular to the paper according to the wavelength of the input signal light. The wavelength dispersion elements 28, 29 may be arranged between the optical element 23 and the phase modulator element 24 and between the phase modulator element 24 and the optical element 25.

In the configuration of the second input/output device, the example of the (1×n) switch is given; however, a configuration of an (n×1) switch with n input ports and one output port may be adopted, or a configuration of an (n×1) switch with n input ports and one output port may be adopted.

[Configuration of Phase Modulator]

Figure 5A:
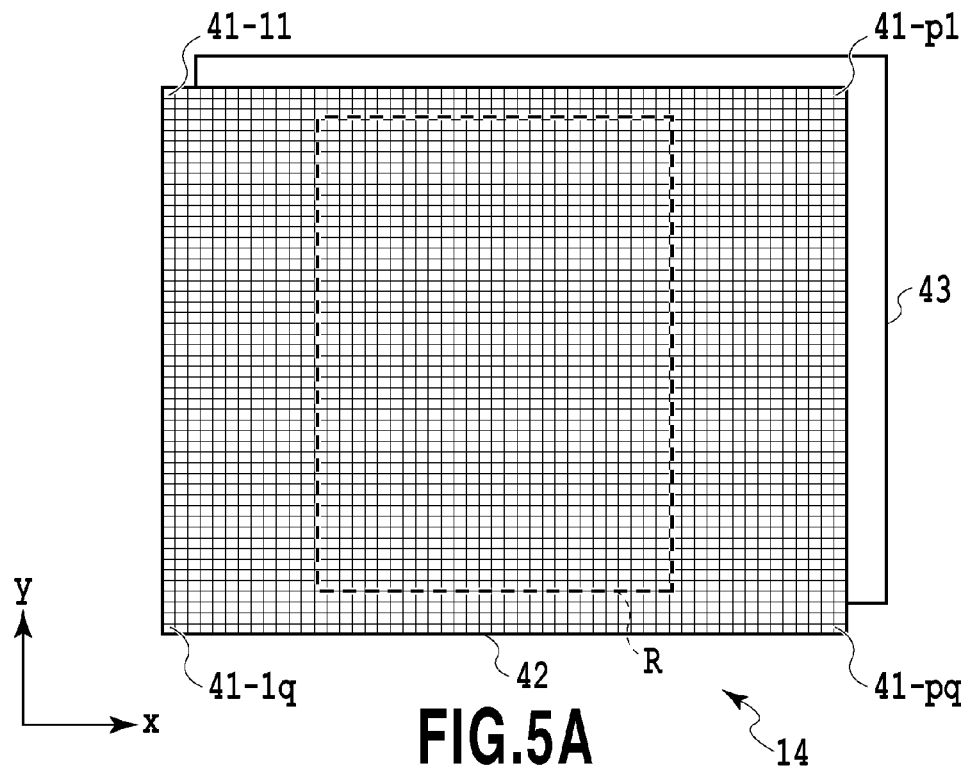
FIG. 5A is a view illustrating a configuration of a phase modulator element.
Figure 5B:
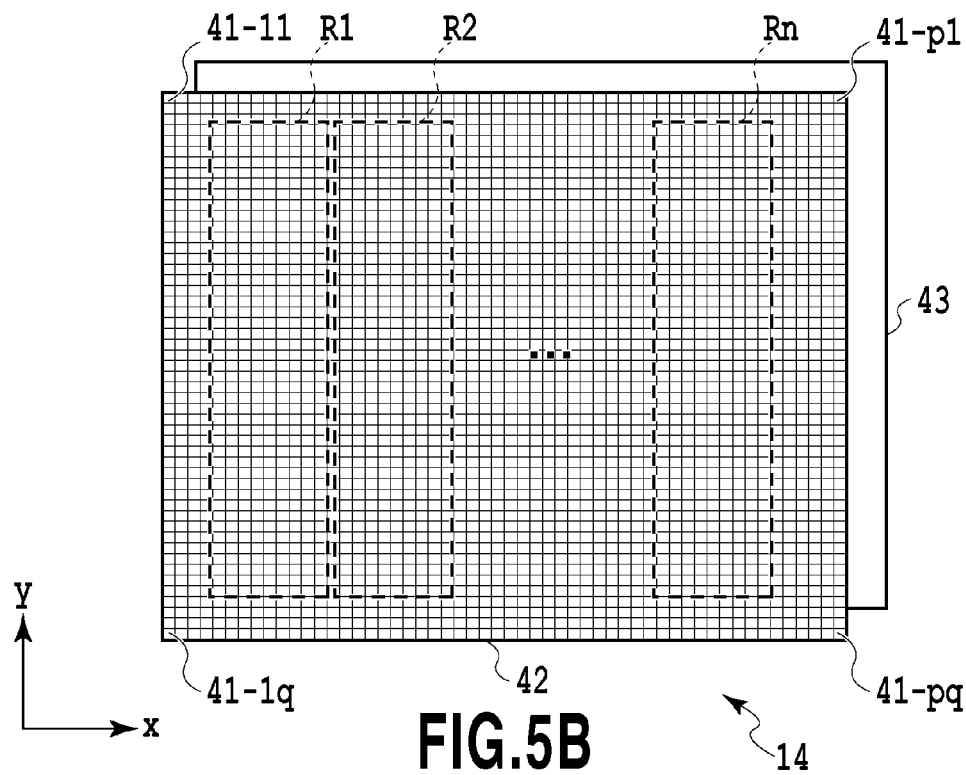
FIG. 5B is a view illustrating a configuration of a phase modulator element in a case of an optical configuration having wavelength selectivity.

Next, detailed description will be given with regard to the phase modulator elements 14, 24 for use in the optical input/output devices. FIGS. 5A and 5B are views illustrating a configuration of a reflection type phase modulator element as viewed from a direction of a z axis, and FIG. 5A illustrates a light irradiation region, and FIG. 5B illustrates the light irradiation region dissolved into wavelength channels. The phase modulator element 14 includes many pixels 41-11, 41-pq such that (p×q) pixels arranged in a matrix in an x-y plane can independently set a phase between incoming light as signal light entering each pixel and outgoing light as signal light exiting each pixel, a driver element 42 for control of the phase of each pixel, and a reflector portion 43 provided on an backside. A combination of values of phases (or phase values) independently set according to the position of the each pixel will be called a phase pattern. The phase pattern is converted into a driving signal of the driver element. A desired phase can be set for each pixel by driving each pixel according to the converted driving signal. Note that a transmission type phase modulator element has the same configuration as that of the phase modulator element of FIGS. 5A and 5B except that the transmission type phase modulator element is not provided with the reflector portion 43 on the backside in FIGS. 5A and 5B. In the above-described optical input/output device, the light irradiation region through which light enters the phase modulator element is defined as a region R illustrated in FIG. 5A. The direction of travel of outgoing light and light power in the direction can be controlled by controlling a wave surface of outgoing light by giving a specific phase pattern to each pixel in the region R.

Also, in a case where incoming light is a WDM signal and is dispersed by the diffraction grating in the direction of the x axis (for example, perpendicularly to the paper as seen in FIGS. 2, 4), entry regions vary according to the wavelength channel as illustrated in FIG. 5B and are regions R1 to Rn. In this case, the output port and the output light attenuation level, which vary according to the wavelength channel, can be set by independently controlling the phase patterns of the regions R1 to Rn.

The phase modulator elements 14, 24 can be implemented for example by using LCOS (Liquid Crystal on Silicon) having plural pixels. In the elements, for the amount of phase modulation (or the phase), a direction of orientation of a liquid crystal material for each pixel can be controlled by a voltage applied to a driver electrode, and thereby, a refractive index of a liquid crystal sensed by incoming light can be changed to control the phase between the incoming and outgoing light. A transparent electrode is used as a surface electrode and a reflection electrode is used as a backside electrode, and thereby, a reflection type phase modulator can be implemented. Also, transparent electrodes are used as both the surface electrodes and backside electrodes, and thereby, a transmission type phase modulator can be implemented. Also, a material exhibiting an electrooptic effect may be used in place of the liquid crystal material.

In the phase modulator elements 14, 24 using LCOS, the amount of phase modulation for each pixel can be controlled by controlling the voltages applied to the liquid crystal driver electrodes which form the phase modulator elements 14, 24. In other words, in the phase modulator elements 14, 24, a phase value is set so as to generate a desired phase pattern according to the selected input/output port or attenuation level, and thereby, a voltage according to the phase value is applied to the driver electrode.

The phase modulator elements 14, 24 may also be implemented by using MEMS (MicroElectroMechanical Systems) mirrors. For example, a voltage is applied to displace the mirror corresponding to the position of each pixel in the direction of the z axis and thereby change an optical path for each pixel, thus enabling control of the phase.

[Method for Selecting Output Path]

Figure 6:
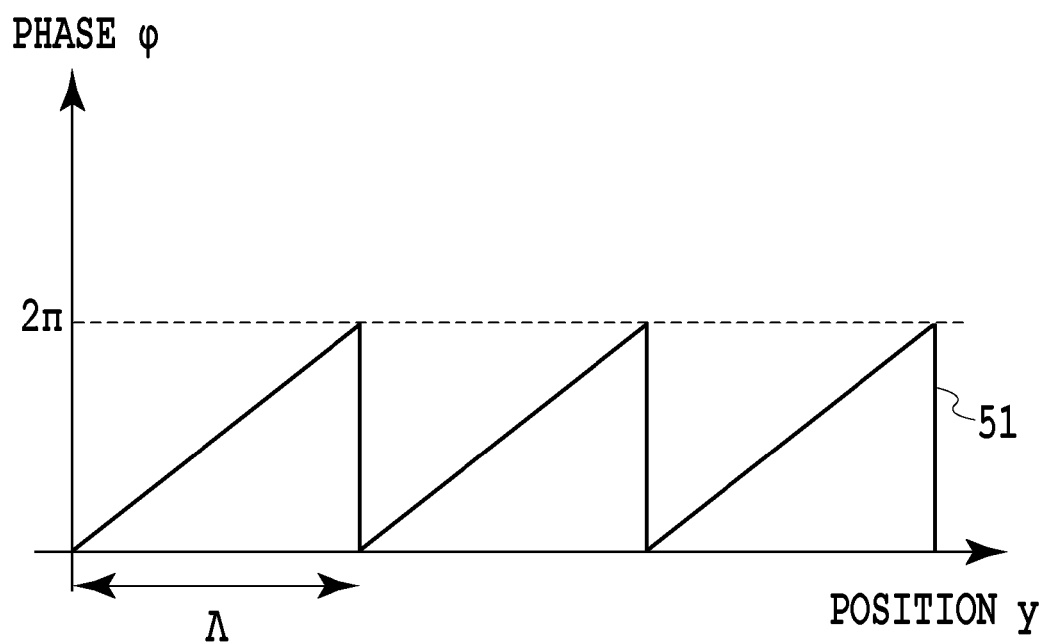
FIG. 6 is a graph illustrating an example of a phase pattern for coupling light to an output port.
Figure 7:
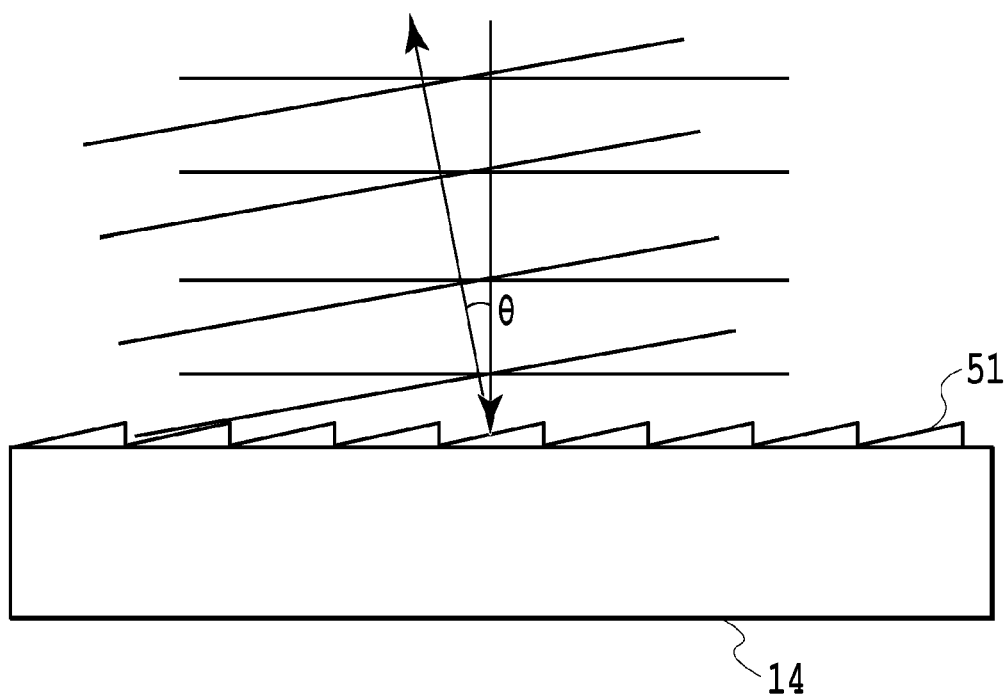
FIG. 7 is a view illustrating an example of diffraction from the reflection type phase modulator element.

Next, description will be given with regard to a method for selecting an output direction by the phase modulator element. FIG. 6 is a graph illustrating an example of a phase pattern for coupling light to the output port, and FIG. 7 is a view illustrating an example of diffraction from the reflection type phase modulator element. Selection of the output direction is accomplished for example by controlling an angle of diffraction of light entering the phase modulator element. The set phase value has a saw tooth-shape 51 as illustrated in FIG. 6, and thereby, the angle of diffraction of an outgoing wave can be controlled as illustrated in FIG. 7. Preferably, the phase pattern is a periodic phase pattern having periodicity repeating the same phase pattern. Here, an angle of diffraction $\theta o$, specifically, an angle formed by the outgoing light with respect to a normal direction of the phase modulator element, is given by Equation (1):

$$\sin \theta in + \sin \theta o = m \cdot \lambda / \Lambda \qquad (1)$$

where $\theta in$ denotes an angle formed by incoming light with respect to the normal direction of the phase modulator element, m denotes a diffraction order, $\lambda$ denotes the wavelength of input signal light, and $\Lambda$ denotes a length of a period of the phase pattern.

Optical coupling to an arbitrary output port can be accomplished by adjusting $\theta o$ by changing $\Lambda$ so as to obtain optimum optical coupling for a desired output port.

[Light Power Control Method]

[First Embodiment]

Next, description will be given with regard to a first embodiment of the present invention for changing light power by using the phase modulator element. In the optical input/output device according to the present invention, the phase pattern set in the phase modulator element is such that a periodic phase pattern is superimposed on a phase pattern capable of providing optical coupling between the input/output ports as described above, and thereby, output light intensity is controlled. Signal light is diffracted at a position according to the period and pattern shape of the superimposed periodic phase pattern, and the light intensity of the signal light is dispersed thereby to enable controlling the intensity of the signal light optically coupled between predetermined input/output ports. The periodic phase pattern is specified by a function of a position in the phase modulator element and the phase of light reflected or transmitted at the position, and has a pattern shape having a predetermined period w in a direction of the y axis as illustrated for example in FIGS. 9A to 9D.

Figure 8A:
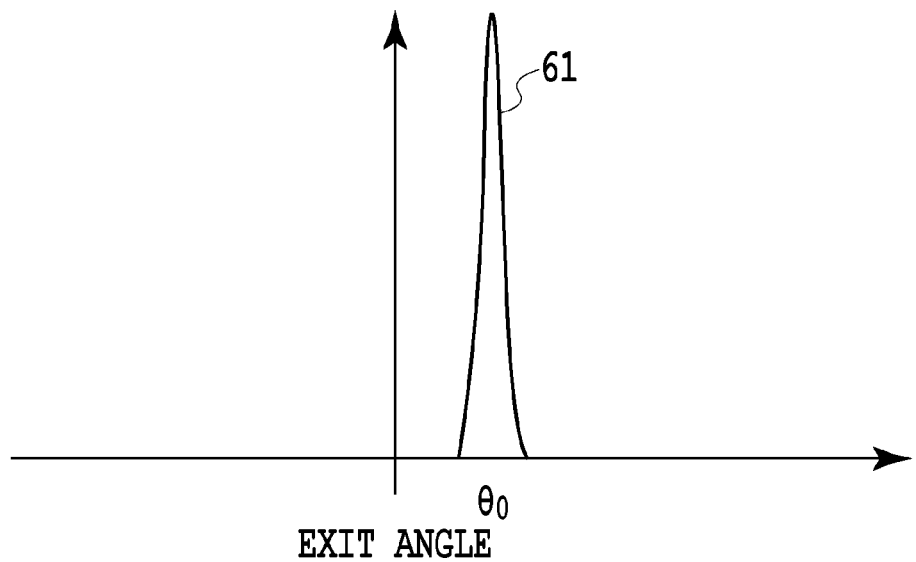
FIG. 8A is a graph illustrating an example of deflection properties in a case where a periodic phase pattern is not superimposed.
Figure 8B:
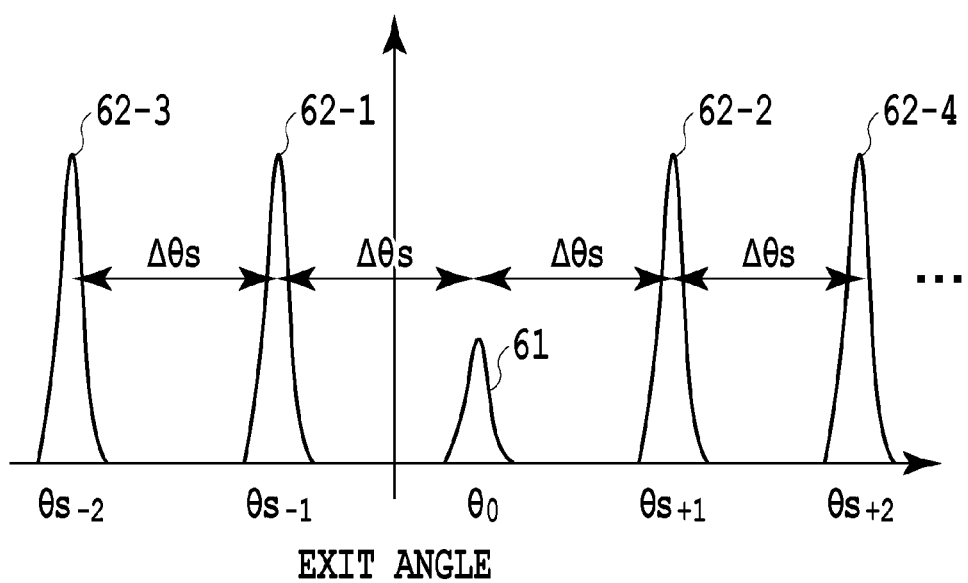
FIG. 8B is a graph illustrating an example of deflection properties in a case where the periodic phase pattern is superimposed.

FIG. 8A is a graph illustrating an example of deflection properties in a case where the periodic phase pattern is not superimposed, and FIG. 8B is a graph illustrating an example of deflection properties in a case where the periodic phase pattern is superimposed. Also, FIG. 9A is a graph illustrating a case where a saw tooth wave is superimposed as a first example of the superimposed periodic phase pattern, FIG. 9B is a graph illustrating a case where a sine wave is superimposed as a second example of the superimposed periodic phase pattern, FIG. 9C is a graph illustrating a case where a triangular wave is superimposed as a third example of the superimposed periodic phase pattern, and FIG. 9D is a graph illustrating a case where a rectangular wave is superimposed as a fourth example of the superimposed periodic phase pattern.

Among these, description will be given taking as an example the case where the periodic phase pattern having the pattern shape of the saw tooth wave is superimposed. Preferably, the phase pattern capable of providing the optical coupling between the input/output ports is a saw tooth-shaped phase pattern 51 as illustrated for example in FIG. 6 and the saw tooth wave have an amplitude of $2\pi$. In a case where this phase pattern alone is present, light exits only in a direction of an exit angle $\theta o$ such that the light is optically coupled to the output port, as illustrated in FIG. 8A. A phase pattern 53 is superimposed on this phase pattern as illustrated in FIG. 9A, and the phase pattern 53 is such that a phase $\phi$ in a period of the superimposed periodic phase pattern is represented as Equation (2).

$$\phi = k \times y'/w \qquad (2)$$

Thereby, as illustrated in FIG. 8B, a peak 62 appears in an angle direction of $\theta sm$ (in a case of FIG. 8B, m is an integer between −2 and 2) according to the diffraction order m, and light power having a peak 61 can be distributed. Here, w denotes a length of a period of the superimposed periodic phase pattern, k denotes a constant, and y' denotes the position of the phase modulator element in a period of the periodic phase pattern changing in the direction of the y axis. Note that Equation (2) can be rewritten in a form including an initial phase, by further using an arbitrary constant b to represent the phase $\phi$ as Equation (3).

$$\phi = k \times (y'/w + b) \qquad (3)$$

k is changed to control the amplitude of the superimposed periodic phase pattern and thereby enable controlling the light power in the exit direction. In other words, attenuation of the output port becomes possible.

$\theta sm$ can be expressed by Equation (4):

$$\theta sm = \theta o + m \times \arctan(\lambda/w) \qquad (4)$$

where m denotes the diffraction order and is an integer.

Here, $\Delta \theta s$ is defined as the following equation: $\Delta \theta s = \theta s1 - \theta o$. In other words, $\Delta \theta s$ is represented as the following equation: $\Delta \theta s = \arctan(\lambda/w)$.

According to the first embodiment, $\Delta \theta s$ is set by the period w of the superimposed periodic phase pattern by the above equation, and the power (or light intensity) of light outputted from the output port can be controlled.

[Second Embodiment]

Next, description will be given with regard to a second embodiment of the present invention for changing light power by using the phase modulator element. w can be set independently of Λ previously mentioned, and θsm can be set to be in a gap of the output port.

Here, discussion will be made with regard to a case where the phase pattern capable of providing the optical coupling between the input/output ports is set for example in a saw tooth shape along the y axis in a plane of the phase modulator element and the superimposed phase pattern likewise has periodicity along the y axis. The y axis is an axis which coincides with a direction of arrangement of incoming and outgoing light at the ports of the optical elements 13, 23, 25. In this case, the peak 62 appears in a direction of arrangement of the input/output ports.

An entry angle of light entering through the input port into the phase modulator element is defined as θin, and an exit angle of outgoing light to the output port is defined as θo. The periodic phase pattern is superimposed on the phase pattern capable of providing the optical coupling between the input/output ports, and thereby, the exit direction θsm' with respect to the entry angle of diffracted light is represented as the following equation:

$$\theta sm'=\theta i+m\Delta\theta s$$

where θi denotes an angle formed by the incoming and outgoing light (=θo−θin), Δθs=arctan (λ/w); w denotes the period of the periodic phase pattern, λ denotes the wavelength of the signal light, and m denotes the diffraction order and an integer.

Another input/output port is arranged at a position where the diffracted light does not exit (or the port is not arranged at an exit position θi), or equivalently, θsm' is in a gap of the angle of incoming and outgoing light at the input/output port, thereby to enable controlling the power of light outputted from the output port, while suppressing crosstalk.

Figure 10:
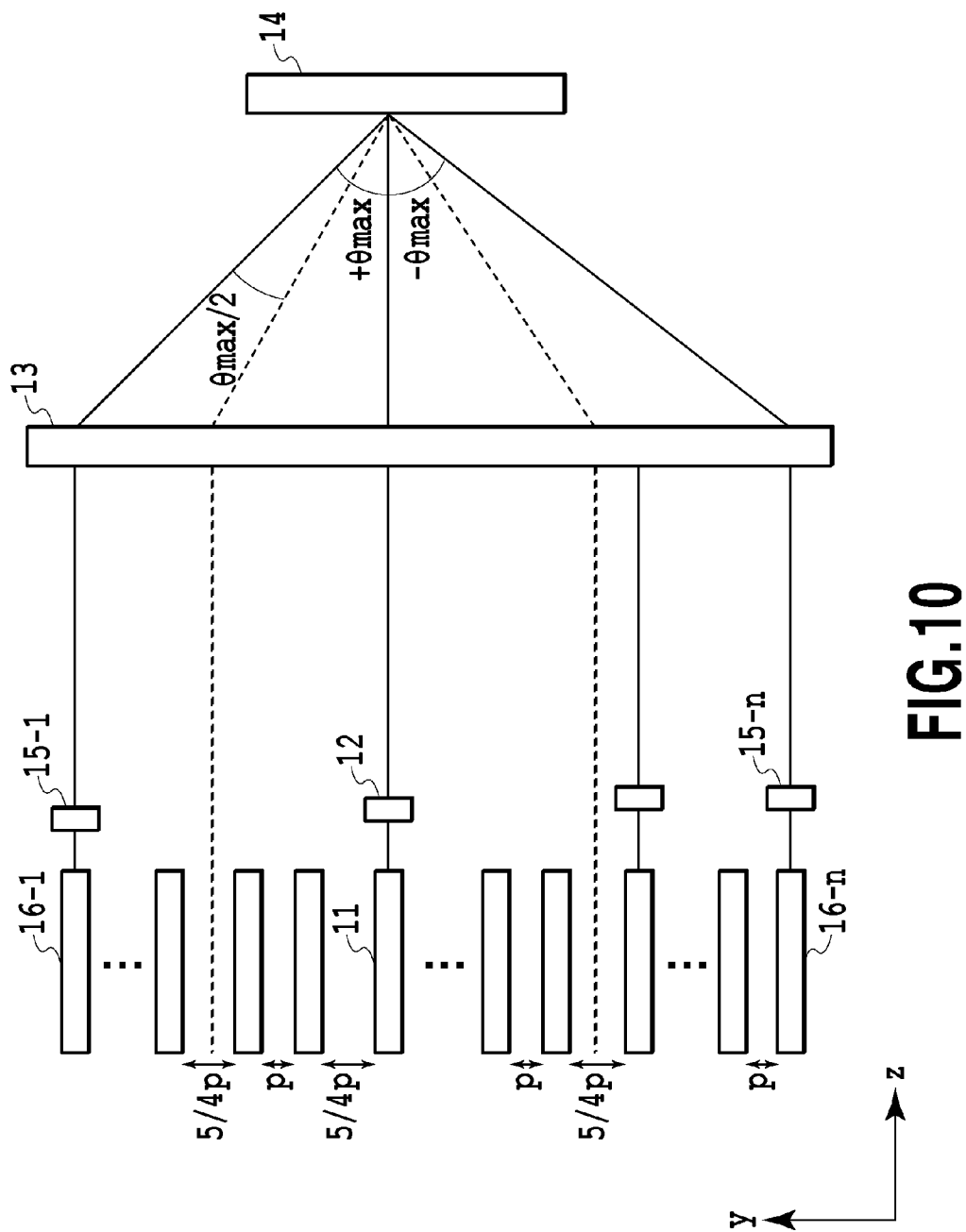
FIG. 10 illustrates an example in which the ports are arranged so as to enable controlling light power while reducing crosstalk.

FIG. 10 illustrates an example in which the ports are arranged so as to enable controlling the light power while reducing crosstalk. For example, in a case where N is a variable associated with a port number, or equivalently, a maximum value of the exit angle to the output port is θmax and N' is the number of ports arranged in an angle range of θmax/2, an integer between 0 and N'−1 is set. Also, if p is a constant, as illustrated in FIG. 10, the input port is arranged so that θ=0 and an angle θp of outgoing light to the output port is between ±θmax and is represented as the following equations, and the period of the superimposed periodic phase pattern is determined so that Δθs=θmax/2.

$$\theta p=-\theta\max+N\cdot p(-\theta\max\leq\theta<-\theta\max/2)$$

$$\theta p=-\theta\max+(N+1/4)p(-\theta\max/2\leq\theta p<0)$$

$$\theta p=-\theta\max+(N+1/2)p(0\leq\theta p<\theta\max/2)$$

$$\theta p=-\theta\max+(N+3/4)p(\theta\max/2\leq\theta p<\theta\max)$$

In this case, the power of light outputted from the output port can be controlled, while crosstalk is suppressed.

In the second embodiment, the port is arranged at a position where high-order light does not exit (or the port is not arranged at an exit position θp+mΔθs) thereby to enable controlling the power of light outputted from the output port, while suppressing crosstalk.

[Third Embodiment]

Next, description will be given with regard to a third embodiment of the present invention for changing light power by using the phase modulator element, taking as an example a case where a saw tooth wave is superimposed.

Figure 11:
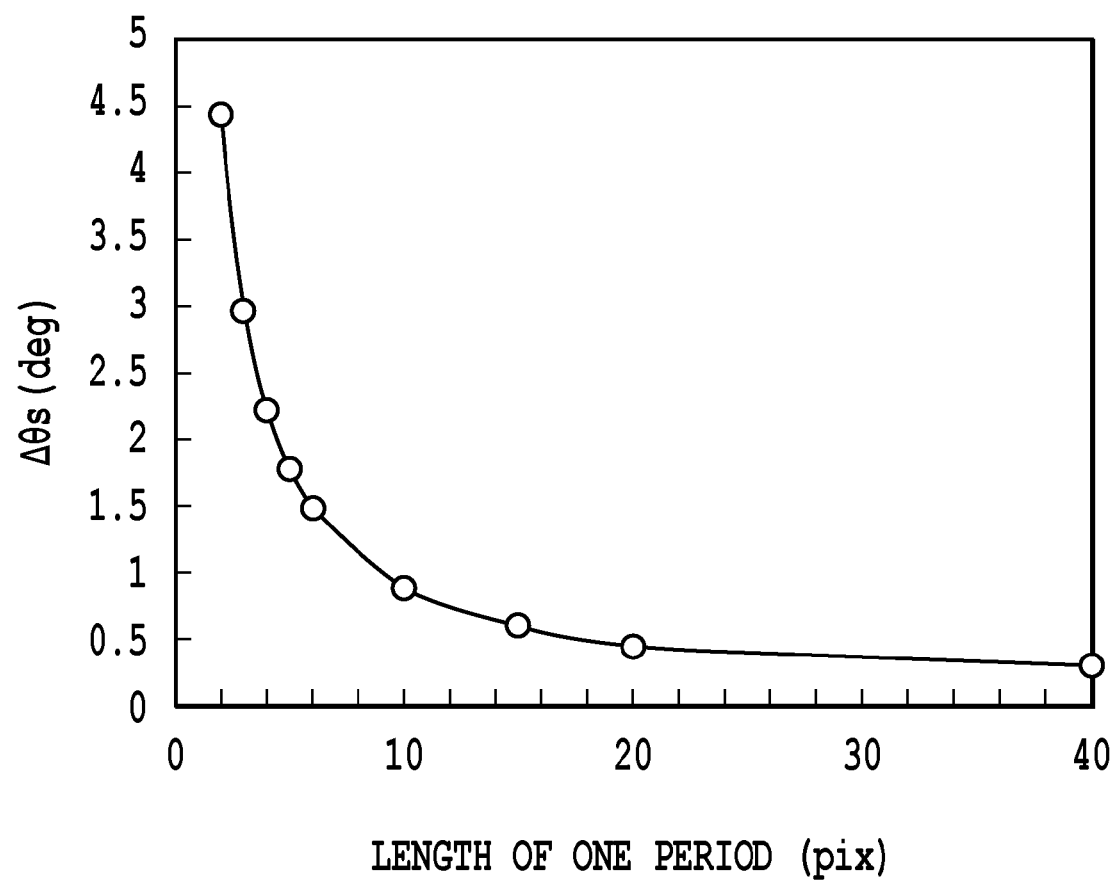
FIG. 11 is a graph illustrating an example of a relationship between a superimposed phase period and an exit angle of light appearing by superimposing the periodic phase pattern.

In a case of the first embodiment, in a case where Δθs is less than Δθp=(θmax−θmin), which is a range in which the port is set, where θmax and θmin each denote the exit angle for optical coupling to the outermost port, the peak 62 is present within a range in which the input/output port is arranged, and thus, the input/output port cannot be densely arranged. This causes an increase in the size of the optical input/output device, and therefore, it is desirable that Δθs be more than Δθp. FIG. 11 illustrates a relationship between the period of the superimposed phase and Δθs in a case where the wavelength λ=1.61 μm. A pixel size is calculated, assuming that one pixel=10.4 μm. From FIG. 11, setting can be made so that Δθs is more than Δθp. Specifically, control can be performed so as to superimpose a periodic phase pattern having periodicity in the direction of the y axis and having a period having a length w represented as Equation (5):

$$w<\lambda/\tan(\theta\max-\theta\min) \qquad (5)$$

where θmax and θmin denote the maximum value and the minimum value of the angle θ formed by outgoing light and incoming light at the time of optical coupling, and λ denotes the wavelength of input signal light.

Figure 12:
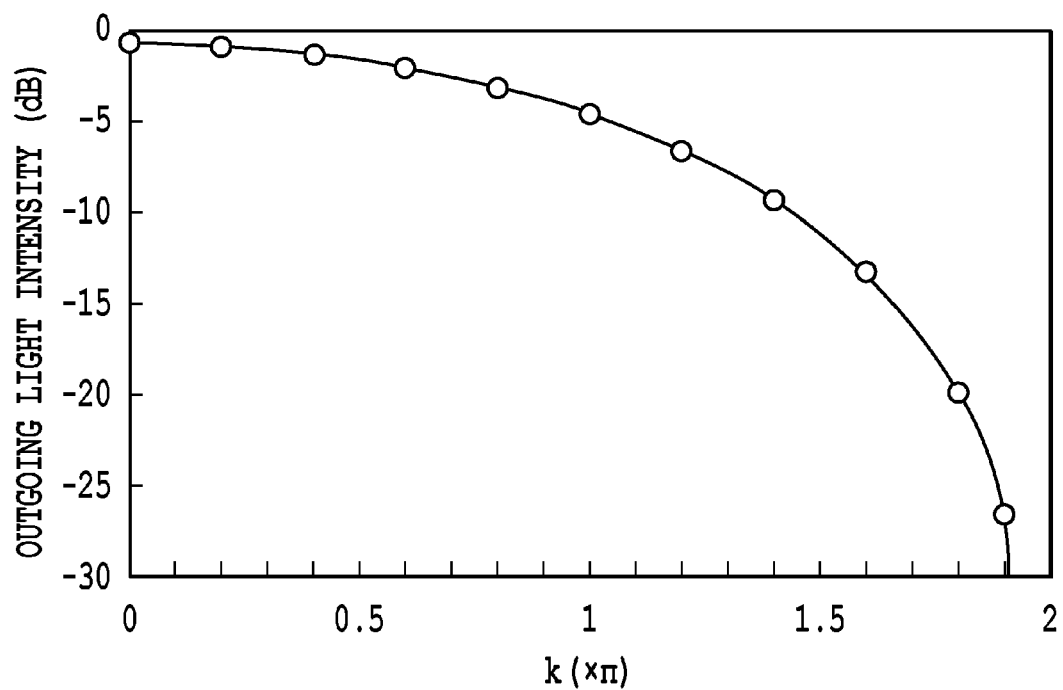
FIG. 12 is a graph illustrating an example of a relationship between an amplitude of the superimposed phase and light power.
Figure 13:
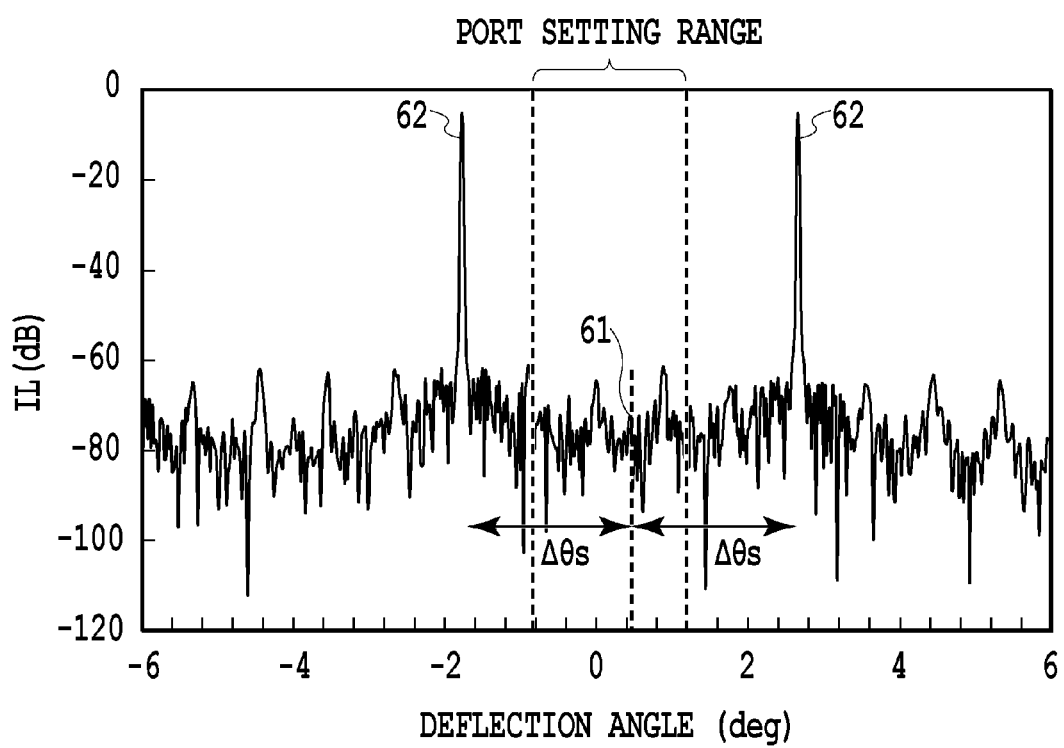
FIG. 13 is a graph illustrating an example of deflection properties in a case where the phase pattern is superimposed so that light exits outside the port.

For example, in a case where Δθp=1.6°, the length of one period can be set equal to or less than 4 pixels. FIG. 12 illustrates a relationship between the light power intensity and the amplitude k of the superimposed phase pattern, in a case where LCOS is used as the phase modulator element, the input/output port is set so that θ=−0.8° to 0.8°, and the phase period is set equal to 4 pixels. The light power of the input signal light is set to 0 dB. From FIG. 12, it can be seen that the optical attenuation level can be arbitrarily controlled by changing k. FIG. 13 illustrates a relationship between the beam exit angle and the light power at this time. In a case where the light power of outgoing light is attenuated, the light power can be concentrated outside the output port.

[Fourth Embodiment]

Next, description will be given with regard to a fourth embodiment of the present invention for changing light power by using the phase modulator element, taking as an example a case where a saw tooth wave is superimposed.

Figure 14:
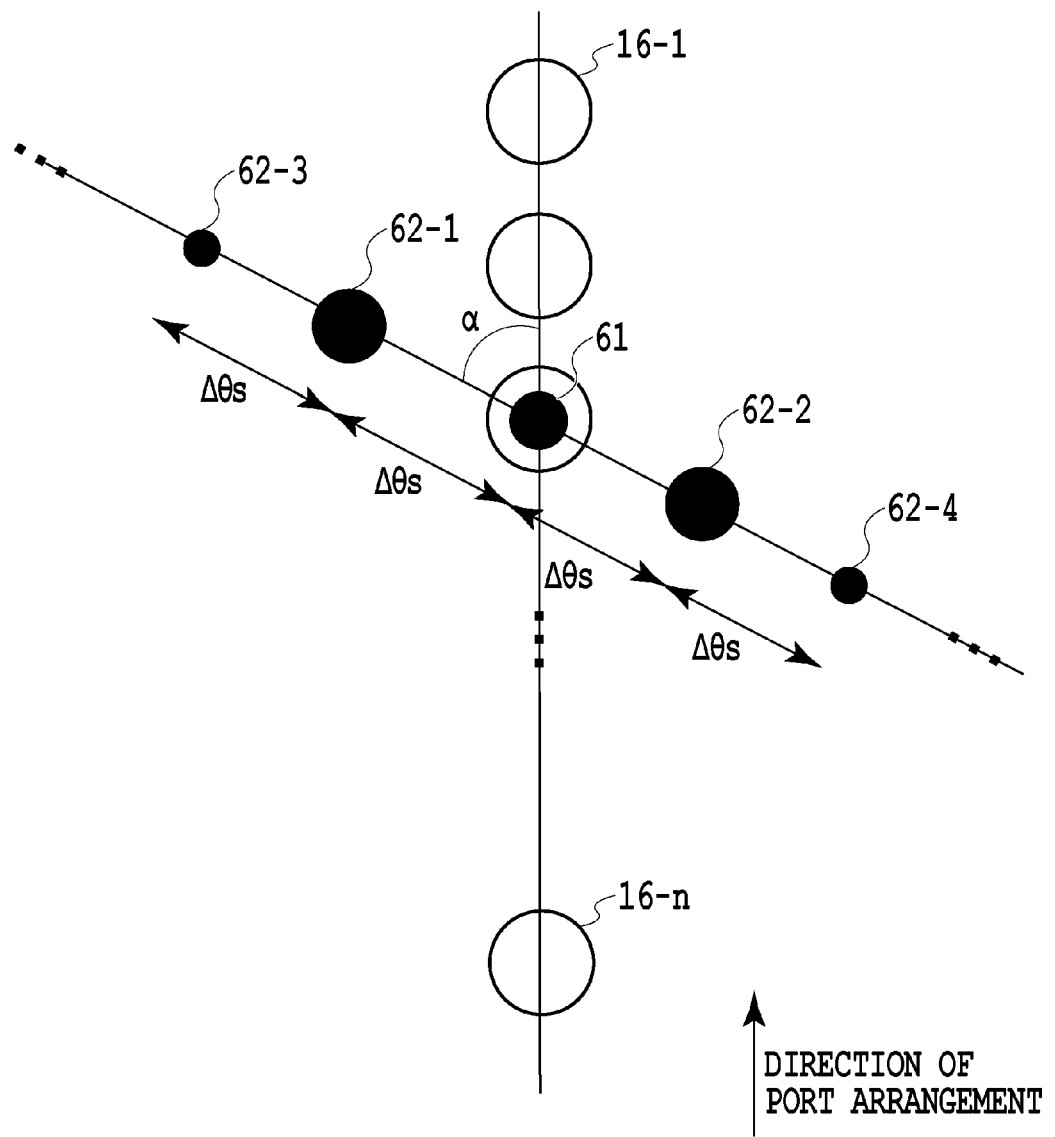
FIG. 14 illustrates an example in which control is performed so that light peak appears in a different direction from a direction of arrangement of the output port.
Figure 15:
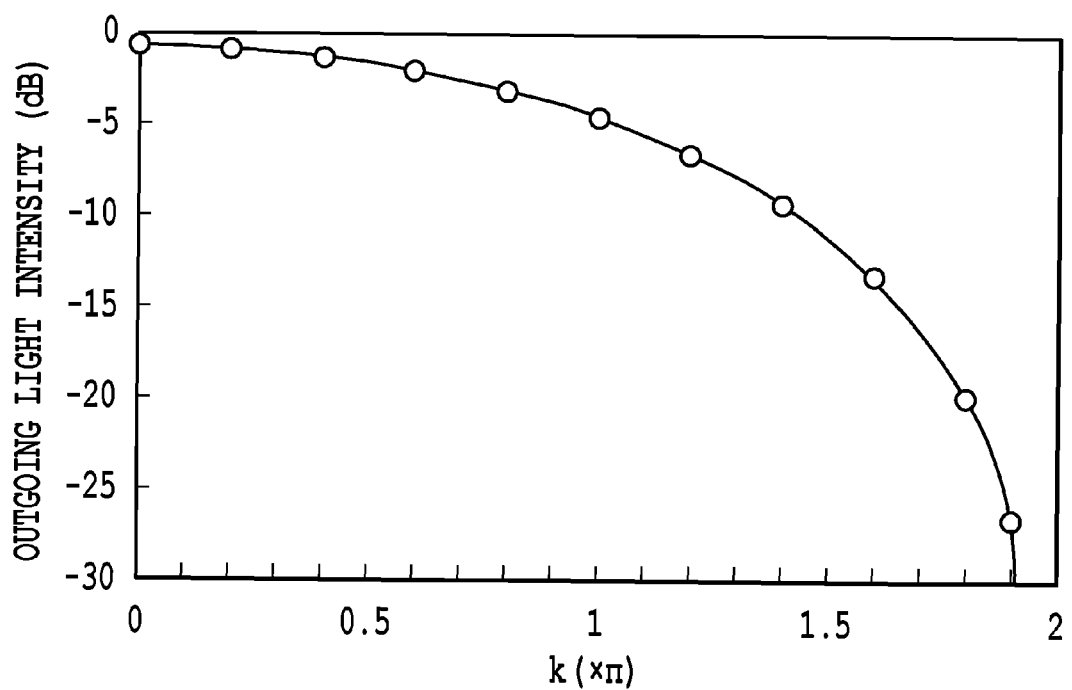
FIG. 15 is a graph illustrating an example of a relationship between the amplitude of the superimposed phase and the light power.
Figure 16:
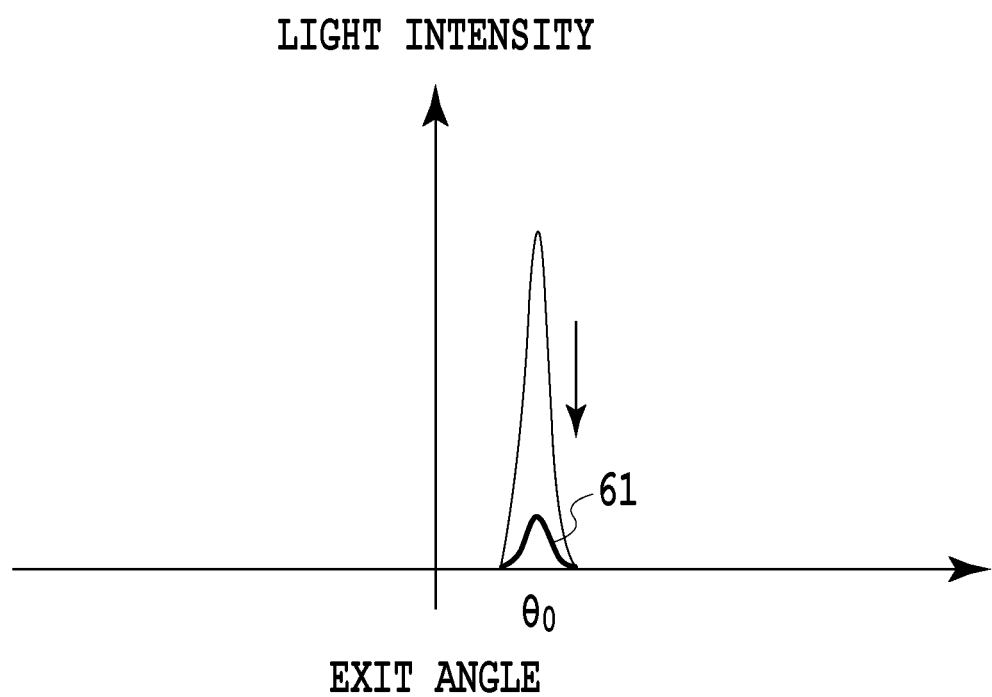
FIG. 16 is a graph illustrating an example of a relationship between the amplitude of the superimposed phase and the light power.

Here, discussion will be made with regard to a case where the phase pattern for the optical coupling between the input/output ports is set for example in a saw tooth shape along the y axis in the plane of the phase modulator element and the superimposed phase pattern likewise has periodicity along a direction other than the y axis. In this case, peaks 62-1, 62-2, 62-3, 62-4 appear at positions which do not lie on a straight line on which the port is arranged, and thus, the advantageous effect that crosstalk does not occur even without consideration for the arrangement of the port can be achieved. For example, in a case where the phase pattern 51 for the optical coupling between the input/output ports has periodicity in the direction of the y axis, if a periodic phase pattern having a saw tooth wave shape is superimposed in a direction of an angle a (or a direction of an r axis, which is an arbitrary direction in the plane of the phase modulator element) with respect to the direction of the y axis, the peak 62 appears from the direction of arrangement of the port in the direction of the angle a, as illustrated in FIG. 14. FIG. 15 illustrates a relationship between the light power intensity and the amplitude k of the superimposed phase pattern of Equation (2), in a case where LCOS is used as the phase modulator element, the input/output port is set so that θ=−0.8° to +0.8°, the phase period is set equal to 10 pixels, and α=90°. From FIG. 15, it can be seen that the optical attenuation level can be arbitrarily controlled by changing k. FIG. 16 illustrates a relationship between the beam exit angle and the light power at this time. In a case where the light power of outgoing light is attenuated, crosstalk is suppressed in an output port setting region.

[Fifth Embodiment]

Next, description will be given with regard to a fifth embodiment of the present invention for changing light power by using the phase modulator element.

Figure 17A:
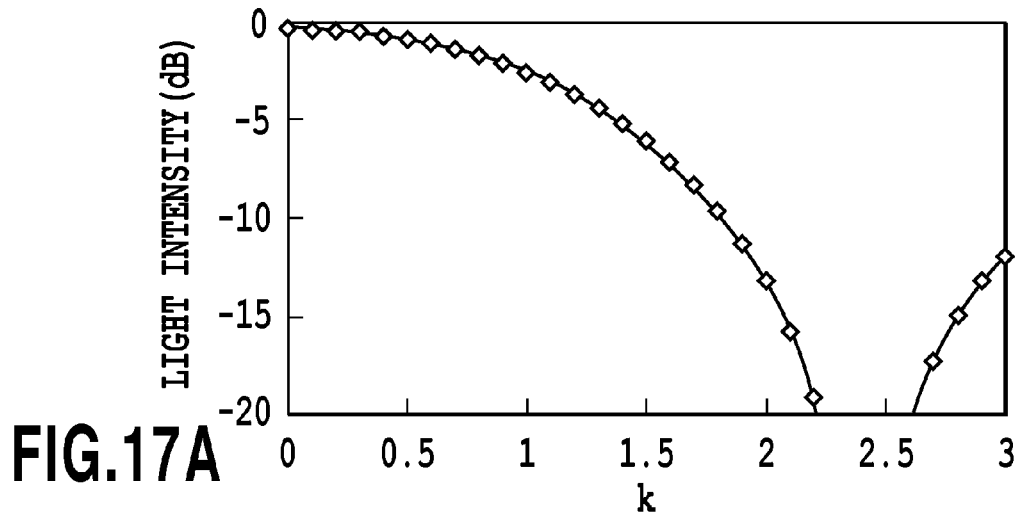
FIG. 17A is a graph illustrating an example of a relationship between the amplitude of the superimposed phase and the light power in a case where the superimposed phase is a sine wave.

In the second to fourth embodiments, the periodic phase pattern having the saw tooth wave shape is superimposed thereby to enable controlling the light intensity, while suppressing crosstalk. However, in a case of the phase modulator element using a liquid crystal such as LCOS, if the set phase pattern has discontinuity such as the saw tooth wave represented by Equation (3), an error in a set phase called discretion occurs. This causes a reduction in setting accuracy of the light intensity or an increase in crosstalk. In order to reduce this, a periodic phase pattern 54 having a sine wave shape, for example, as illustrated in FIG. 9B, can be used as the periodic phase pattern for controlling the light power. In this case, a phase in a period of the periodic phase pattern is given by Equation (6):

$$\phi = k \times (\sin(2\pi \cdot r/w + \Psi) + b) \quad (6)$$

where w denotes the length of one period of the superimposed periodic phase pattern, r denotes the position of the phase modulator element in one period of the periodic phase pattern, and $\Psi$ and b denote constants. Also in a case where the phase pattern of Equation (6) is superimposed, the light power is distributed at an angle of $\theta$s in the same manner as the above-described result, and the light intensity of signal light outputted from the output port can be controlled by changing k as illustrated in FIG. 17A.

[Sixth Embodiment]

Figure 17B:
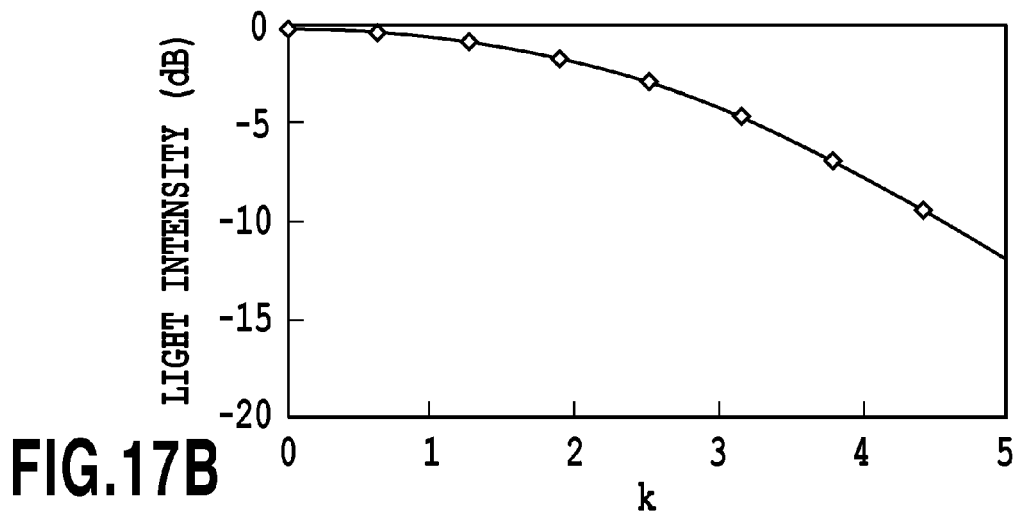
FIG. 17B is a graph illustrating an example of a relationship between the amplitude of the superimposed phase and the light power in a case where the superimposed phase is a triangular wave.

Next, description will be given with regard to a sixth embodiment of the present invention for changing light power by using the phase modulator element. A phase pattern for reducing an influence of discretion may be a periodic phase pattern 55 having a triangular wave shape as illustrated in FIG. 9C. In this case, the phase in one period of the periodic phase pattern is given by Equation (7):

$$\phi = k \times (sr + b) \quad (r \leq p)$$

$$\phi = k' \times (s'r + b') \quad (r > p) \quad (7)$$

where r denotes the position of the phase modulator element in one period of the periodic phase pattern, and s, s', b, b', p are constants. Also in a case where the phase pattern of Equation (7) is superimposed, light power is distributed at an angle of $\theta$s in the same manner as the above-described result, and the light intensity of signal light outputted from the output port can be controlled by changing k, k' as illustrated in FIG. 17B. Note that FIG. 17B illustrates a change in the light intensity only in a case where k is equal to k', but the light intensity changes even in a case where k is not equal to k'.

[Seventh Embodiment]

Next, description will be given with regard to a seventh embodiment of the present invention for changing light power by using the phase modulator element.

A periodic phase pattern for controlling light power may have a rectangular phase shape 56 as illustrated in FIG. 9D. In this case, the phase in one period of the periodic phase pattern is given by Equation (8):

$$\phi = b (r < p, r > q)$$

$$\phi = k + b((p \leq r \leq q)) \quad (8)$$

where r denotes the position of the phase modulator element in one period of the periodic phase pattern, and b, p, q are constants.

Figure 17C:
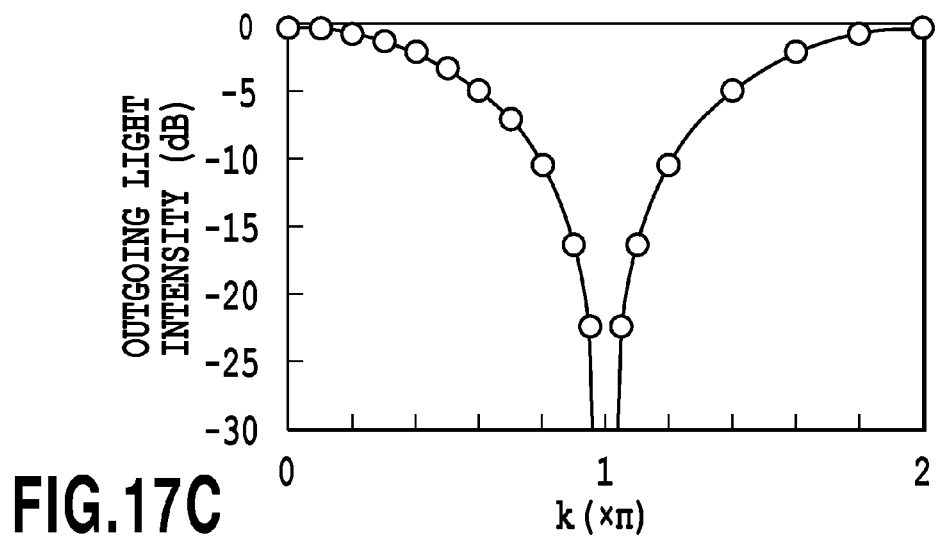
FIG. 17C is a graph illustrating an example of a relationship between the amplitude of the superimposed phase and the light power in a case where the superimposed phase is a pulse wave.

Also in a case where the phase pattern 56 of Equation (8) is superimposed, light power is distributed at an angle of $\theta$s in the same manner as above described, and the light intensity of signal light outputted from the output port can be controlled by changing k as illustrated in FIG. 17C.

[Eighth Embodiment]

Next, description will be given with regard to an eighth embodiment of the present invention for changing light power by using the phase modulator element. In the eighth embodiment, two periodic phase patterns are combined together.

Figure 18A:
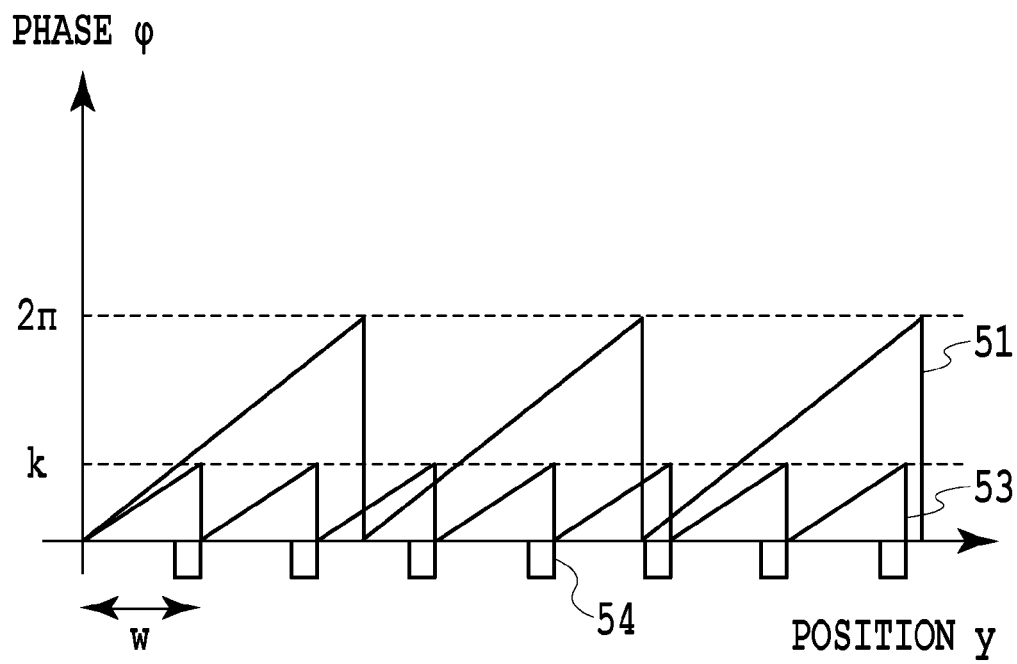
FIG. 18A is a graph illustrating an example of superimposition of a combination of plural phase patterns.
Figure 19A:
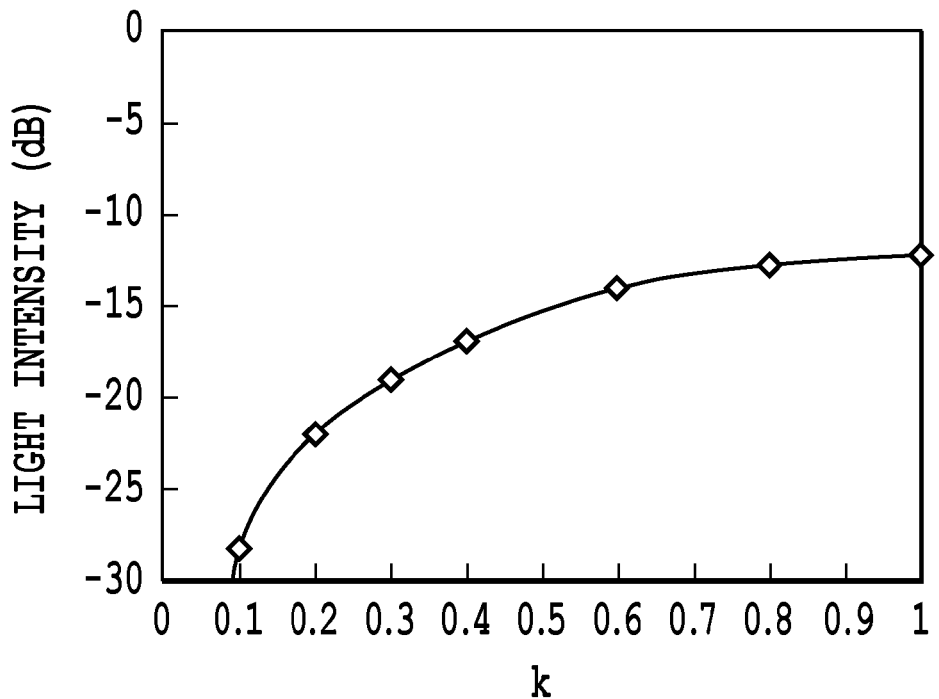
FIG. 19A is a graph illustrating an example of a relationship between the amplitude of the phase of the periodic phase pattern and the light power in a case where the combination of the plural phase patterns is superimposed.

In light intensity control methods described in the first to seventh embodiments, great attenuation of the light intensity increases the sensitivity of the light intensity to the phase amplitude and reduces the setting accuracy of the light intensity. Here, a combination of the plural phase patterns 53, 54 enables controlling the light intensity with high accuracy. FIG. 19A illustrates a relationship between the light intensity and the amplitude k of the periodic phase patterns 53, 54 in a case where the phase in one period is a superimposition of the two periodic phase patterns 53, 54 represented by Equations (3) and (8), as illustrated by example in FIG. 18A. In FIG. 18A, the sign of the amplitude of one periodic phase pattern 54 of the two superimposed periodic phase patterns 53, 54 represents the opposite phase, and thus, in FIG. 19A, the light intensity increases with increasing k. However, the amplitude of the periodic phase pattern of Equation (3) is fixed at k=2$\pi$. The combination of the two periodic phase patterns reduces a sharp change in the light intensity and exhibits the advantageous effect of improving controllability. It is clear that the same effect is expectable with not only this combination but also other combinations.

[Ninth Embodiment]

Next, description will be given with regard to a ninth embodiment of the present invention for changing light power by using the phase modulator element.

Figure 18B:
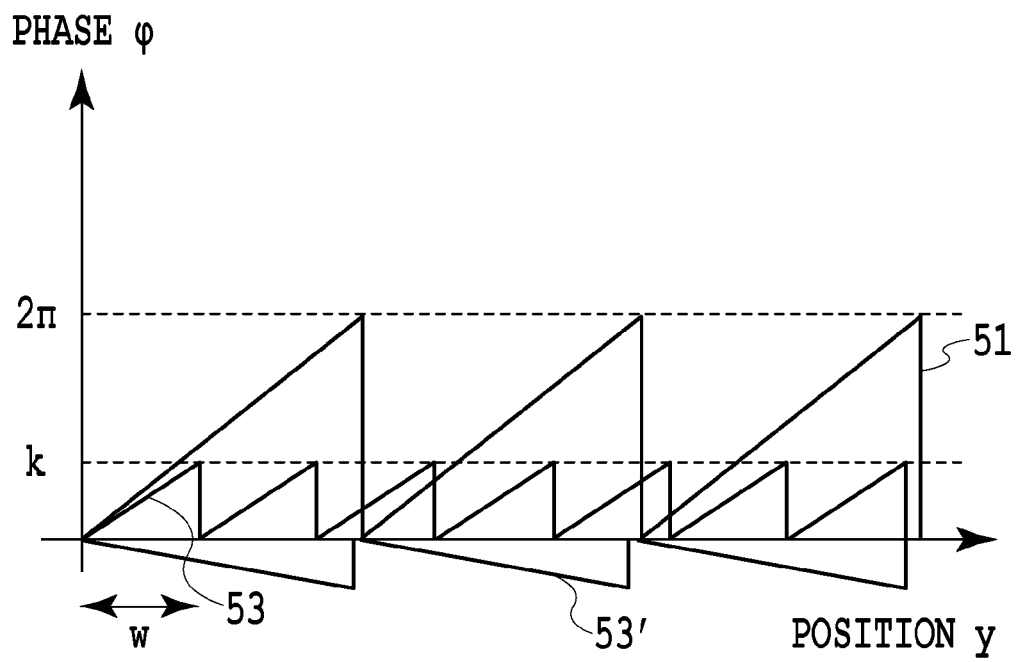
FIG. 18B is a graph illustrating an example of superimposition of different periods and amplitudes of the same phase pattern.
Figure 19B:
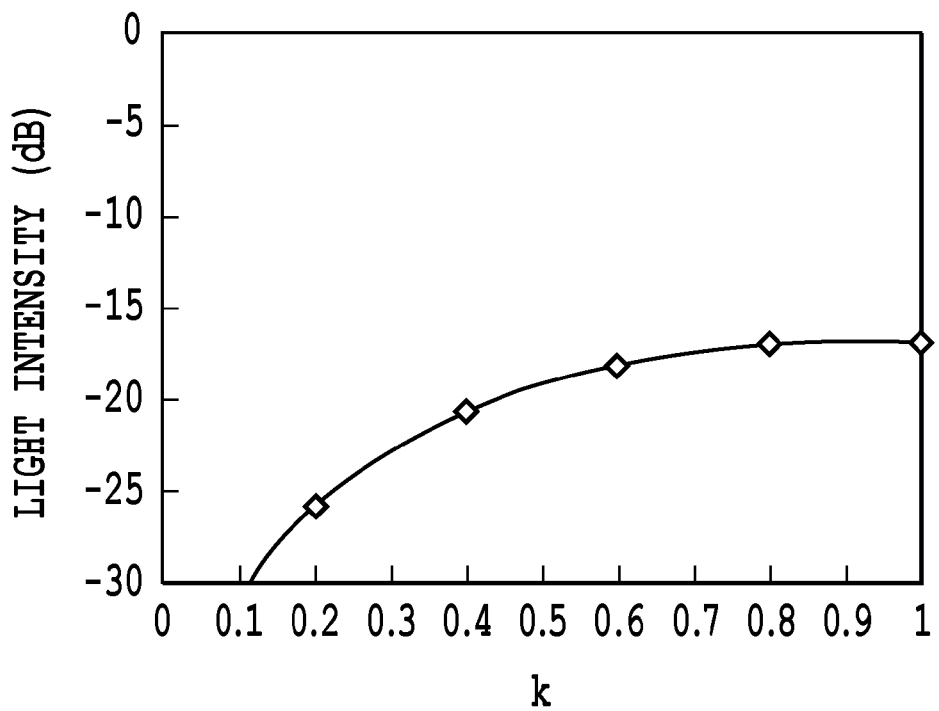
FIG. 19B is a graph illustrating an example of a relationship between the amplitude of the phase of the periodic phase pattern and the light power in a case where the different periods and amplitudes of the same phase pattern are superimposed.

A combination of different periods of the same phase pattern also enables increasing the setting accuracy of the light intensity. An arbitrary phase pattern selected from the phase patterns described in the first to eighth embodiments can be used as the phase pattern. FIG. 19B illustrates a relationship between the amplitude k of one periodic phase pattern 53' and the light intensity in a case where the phase in one period is a superimposition of the periodic phase patterns 53, 53' having two different periods, represented by Equation (3), as illustrated by example in FIG. 18B. In FIG. 18B, the sign of the amplitude of one periodic phase pattern 53' of the two superimposed periodic phase patterns represents the opposite phase, and thus, in FIG. 19B, the light intensity increases with increasing k. However, the amplitude of the one periodic phase pattern 53' is fixed at k=2$\pi$. The combination of different periods of the same pattern enables fine adjustment of light power and exhibits the advantageous effect of improving controllability. It is clear that the same effect is expectable with not only this combination but also other combinations.

Also, the period of the superimposed periodic phase pattern is variable according to a combination of input/output ports for optical coupling thereby to enable controlling the position of occurrence of high-order light for each input/output port for the optical coupling and thus enable reducing limitation on the port arrangement and further suppressing crosstalk.

[Tenth Embodiment]

Next, description will be given with regard to a tenth embodiment of the present invention for changing light power by using the phase modulator element.

Figure 20:
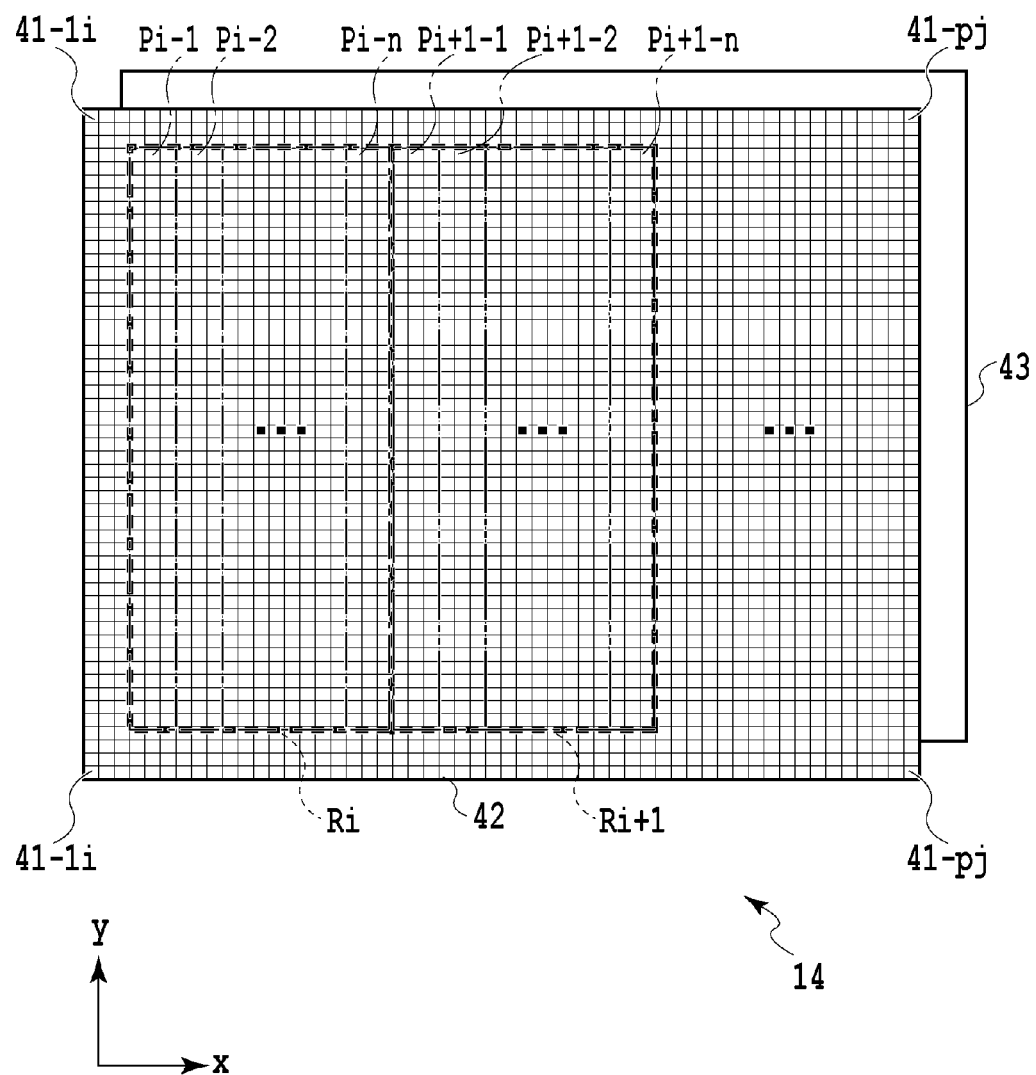
FIG. 20 is a view illustrating an example in which a region is divided into plural regions.
Figure 21:
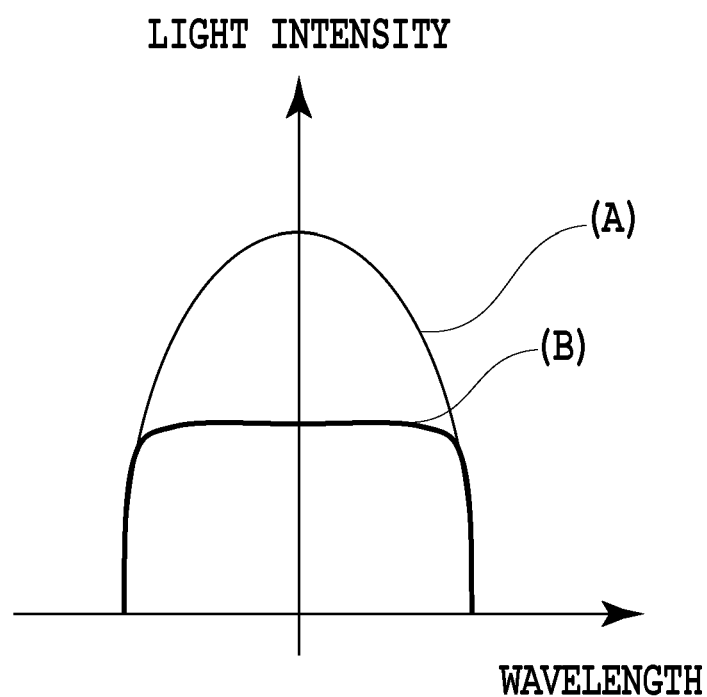
FIG. 21 (A) illustrates an example of optical spectrum in a case where the region is not divided, and (B) illustrates an example of optical spectrum in a case where the region is divided.

Although description has been given above with regard to a case where a uniform periodic phase pattern is superimposed in the plane of the phase modulator element, the intensity of output light can be controlled in the same manner even if a phase setting region is divided into plural regions. An arbitrary phase pattern selected from the phase patterns described in the first to eighth embodiments can be used as the phase pattern. In particular, in a case where the optical input/output device exhibiting wavelength selectivity as illustrated in FIGS. 2 and 4 is used, flatness of the light intensity in the same wavelength channel is required, and thus, as illustrated for example in FIG. 20, a phase setting region Ri is divided into plural regions Pi-1 to Pi-n in a direction in which chromatic dispersion occurs, and thereby, the light intensity in the same wavelength channel can be changed, so that the flatness can be increased. (A) and (B) in FIG. 21 are graphs illustrating optical spectrum in a case where the light intensity is controlled without dividing the region, and optical spectrum in a case where the phase setting region is divided into plural regions to set the phase so that the light intensity is lower in a region closer to a center portion, respectively. As can be seen from the graphs, the region is divided into the plural regions thereby to exhibit the advantageous effect of enabling flattening of a band.

[Eleventh Embodiment]

Next, description will be given with regard to an eleventh embodiment of the present invention for changing light power by using the phase modulator element, taking as an example a case where a saw tooth wave is superimposed. In the eleventh embodiment, the period of the periodic phase pattern is set to have a length of a constituent pixel of the phase modulator element, multiplied by a real number.

Figure 22:
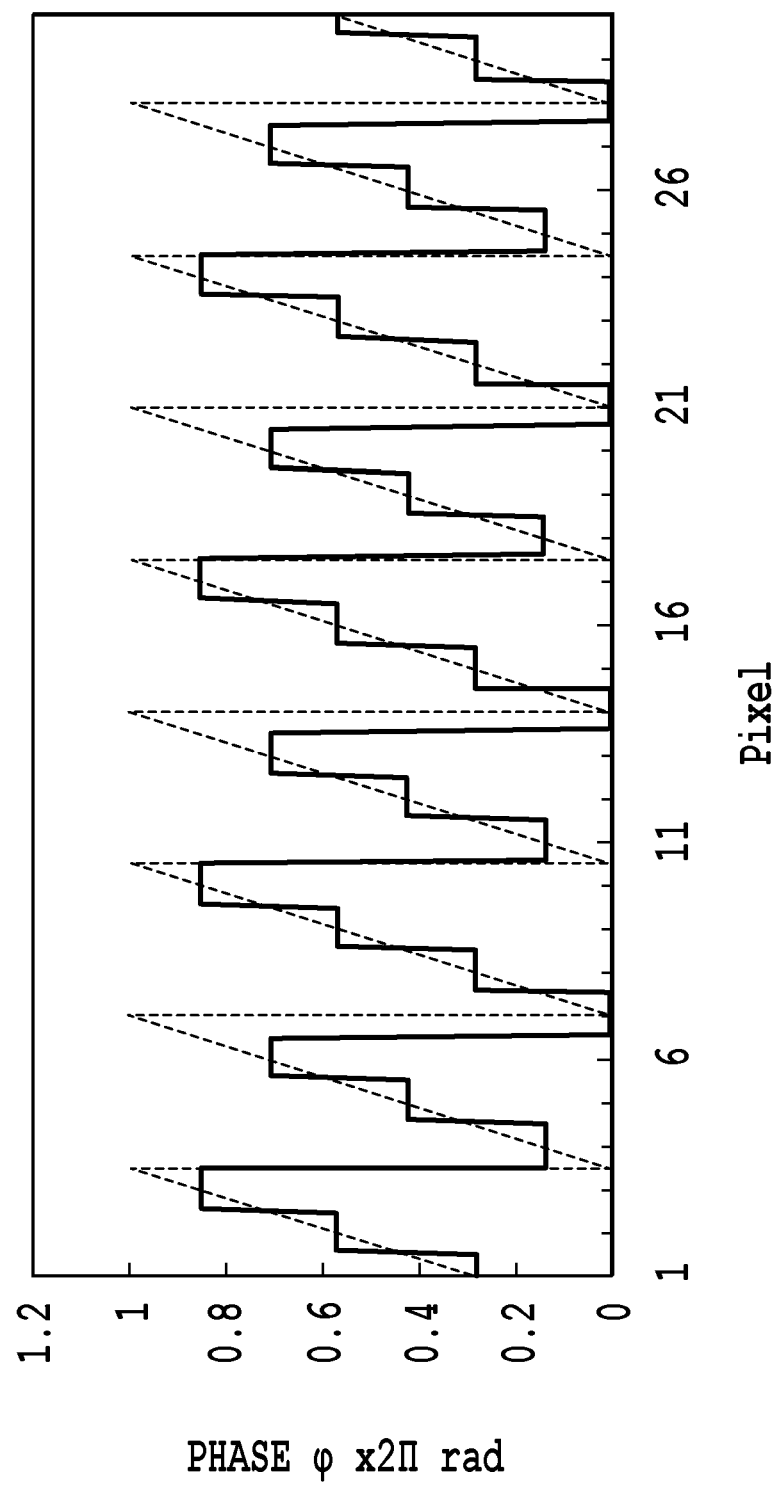
FIG. 22 is a graph illustrating a phase pattern of a saw tooth wave in a case where a period w is set to (3.5× pixel size)
Figure 23:
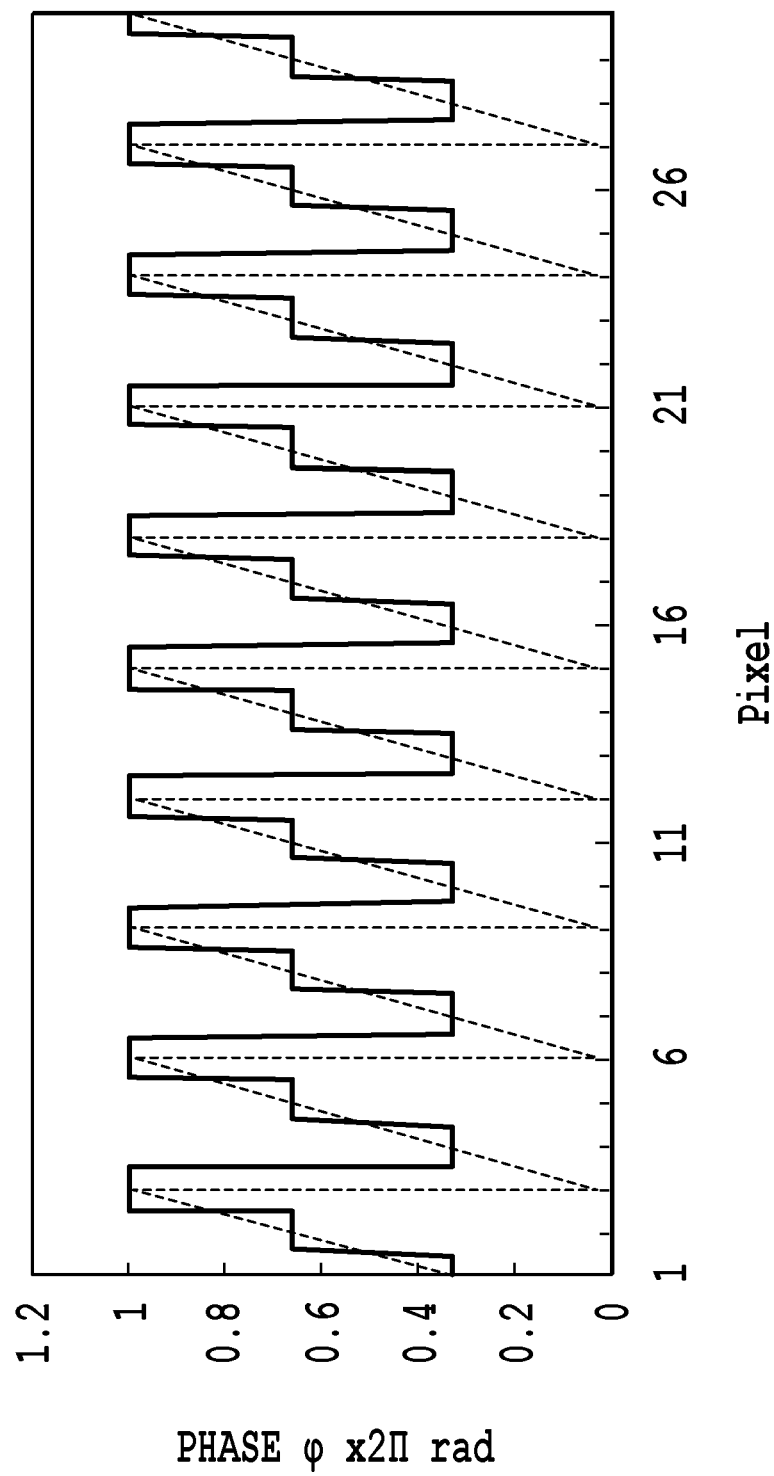
FIG. 23 is a graph illustrating a phase pattern in a case where the period w of the periodic phase pattern is set to (3× pixel size) integral multiple of the pixel size.

FIG. 22 illustrates a phase pattern of a saw tooth wave in a case where the period w is set to (3.5× pixel size), and FIG. 23 illustrates a phase pattern in a case where the period w of the periodic phase pattern is set to (3× pixel size) integer multiple of the pixel size. In FIGS. 22 and 23, dashed lines indicate the phase pattern without consideration for discretion by the pixel, and solid lines indicate the actually set phase pattern.

In a case where the periodic phase pattern is set, the phase value in each pixel is constant and is a spatially discrete phase value. Therefore, if the period of the periodic phase pattern is set to an arbitrary value without depending on the size of the pixel of the phase modulator element, in a case where the period is different from an integer multiple of the pixel, it can be seen that the amplitude of the saw tooth wave in the actually set phase pattern has periodicity as illustrated in FIG. 22. The periodicity of the amplitude (or a modulated frequency) causes high-order light to occur at a different position from a desired position, which in turn becomes a factor for crosstalk.

In the eleventh embodiment, the period w of the superimposed periodic phase pattern is set to an arbitrary value equivalent to a length of integer multiple of the pixel according to the size of the pixel of the phase modulator element, and thus, as illustrated in FIG. 23, the amplitude of the saw tooth wave actually set as the periodic phase pattern can be made uniform, thus enabling crosstalk suppression.

[Twelfth Embodiment]

Next, description will be given with regard to a twelfth embodiment of the present invention for changing light power by using the phase modulator element, taking as an example a case where a saw wave is superimposed.

In the twelfth embodiment, the length of the period of the periodic phase pattern is determined by the input/output port for optical coupling of signal light. The phase pattern applied to the phase modulator element is obtained by superimposing the periodic phase pattern on the phase pattern capable of providing coupling to the output port as described above, and thereby, the output light intensity is controlled. In the present invention, the above-described periodic phase pattern is set to a variable by the angle of exit to the port thereby to enable suppressing an increase in crosstalk during light power attenuation.

Here, the angle direction Os of the peak appearing as a result of light power distribution can be expressed by Equation (4):

$$\theta sm = \theta o + m \times \arctan(\lambda/w) \qquad (4)$$

where m denotes the diffraction order and is an integer, $\lambda$ denotes the wavelength of input signal light, and w denotes the length of one period of the superimposed periodic phase pattern. In Equation (4), particularly in a case where m=1, $\theta s$ is defined as $\theta s1$. Also, $\theta s$ is defined as the following equation: $\Delta\theta s = \theta s1 - \theta o$.

Here, in Equation (4), if $\theta max$ and $\theta min$ are each defined as the exit angle for optical coupling to the outermost port, in a case where the absolute value $|\theta s1|$ of $\theta s1$ is smaller than the absolute values $|\theta max|$ and $|\theta min|$ of $\theta max$ and $\theta min$ in a direction of the optical coupling to the outermost port, the peak is present within a range of arrangement of the input/output port, and thus, light is coupled to a port other than a desired port, so that crosstalk occurs. In order to prevent this, the period can be selected so that $|\theta s|$ is greater than $|\theta max|$ and $|\theta min|$.

Specifically, w can be set to a variable in a range such that the following relationship between w and $\theta o$ is established.

$$w < |\lambda/\tan(\theta max - \theta o)|; \text{ and}$$

$$w < |\lambda/\tan(\theta min - \theta o)|$$

Thus, the length of the period of the periodic phase pattern is determined by the input/output port for optical coupling, and thereby, the period of the periodic phase pattern can be flexibly determined. For example, in a case where the length of the period of the periodic phase pattern cannot be determined for each input/output port, a settable period of the periodic phase pattern for the port located on the outermost side is a short period of two or three pixels or the like, and thus, high-accuracy control is required for setting of the phase pattern. However, in a case where the length of the period of the periodic phase pattern can be determined for each input/output port, as is the case with the twelfth embodiment, the periodic phase pattern to be applied to signal light optically coupled to the input/output port located closer to the inner side can be set to a longer period, and thus, the accuracy of control required for the setting of the phase pattern can be reduced.

According to the present invention, as described in the above embodiments, the periodic phase is superimposed thereby to enable distributing light power in a direction corresponding to the period of the periodic phase. This enables controlling the light intensity of signal light outputted from the output port, while suppressing crosstalk to other ports.

INDUSTRIAL APPLICABILITY

According to the present invention, as described in detail above, in the optical input/output device such as a switch for use in optical communication, the light intensity of signal light outputted from the output port can be controlled without crosstalk between signals.

REFERENCE SIGNS LIST 11, 16-1 to 16-n, 21, 27-1 to 27-n optical fibers
12, 15-1 to 15-n, 22, 26-1 to 2-n collimator lenses
13, 23, 25 optical elements
14, 24 phase modulator elements
17, 28, 29 diffraction gratings
41-11 to 41-pq pixels
42 driver element
43 reflector portion
51 example of phase pattern for optical coupling to output port
53, 54, 55, 56 examples of superimposed periodic phase patterns
61, 62 outgoing light peaks
R, R1 to Rn light irradiation regions
Pi-1 to Pin example of division of phase pattern setting region in the same wavelength channel

The invention claimed is:

1. An optical input/output device comprising:
an input port and an output port configured to input and output signal light, respectively;
a phase modulator element including a plurality of pixels arranged in a matrix in a plane,
a pattern generator unit configured to generate a phase pattern which is a combination of phase values set for each pixel to provide optical coupling to a desired port out of the output port,
a control unit configured to convert the phase pattern into a driving signal for each pixel,
a driver unit configured to drive the pixel according to the driving signal, the phase modulator element being configured to change an optical phase of the signal light entering each pixel, by the driver unit applying the driving signal corresponding to the phase pattern; and
an optical element configured to convert a direction of exit of the signal light so as to irradiate each pixel in the plane of the phase modulator element with the signal light exiting from the input port to a space,
wherein the pattern generator unit includes superimposing means for superimposing a periodic phase pattern having a predetermined period in at least one direction in the plane of the phase modulator element which the signal light enters, and means for controlling an amplitude of the periodic phase pattern,
wherein the signal light is diffracted to a position according to the period and pattern shape of the periodic phase pattern superimposed on the phase pattern capable of providing desired optical coupling between the input port and the output port, so that light intensity of the signal light is dispersed,
wherein the output port or the input port includes a plurality of ports, and the driver unit changes a phase $\phi$ (y) along a y axis of the signal light thereby to provide optical coupling between each input port and each output port, when the y axis is an axis in the plane of the phase modulator element corresponding to a direction of arrangement of the plurality of output ports or the plurality of input ports, and the superimposing means superimposes a periodic phase pattern having periodicity in a direction of the y axis, in which a length w of one period of the pattern is represented as $w < \lambda / \tan(\theta_{max} - \theta_{min})$, when a maximum value and a minimum value of an angle $\theta$ formed by outgoing light and incoming light during the coupling between the input port and the output port are $\theta_{max}$ and $\theta_{min}$, respectively, and $\lambda$ is a wavelength of the input signal light, wherein:
the superimposing means controls light power by superimposing at least two periodic phase patterns selected from a first periodic phase pattern, a second periodic phase pattern, a third periodic phase pattern, and a fourth periodic phase pattern,
the first periodic phase pattern is such that a phase $\phi$ in one period is represented as $\phi = k \times (r/w + b)$, by using k determined according to the light intensity of an output optical signal and an arbitrary constant b, where w is a length of one period of the superimposed periodic phase pattern, and r is the position of the phase modulator element along an r axis in the plane in the period,
the second periodic phase pattern is such that the phase $\phi$ in one period is represented as $\phi = k \times (\sin(2\pi \cdot r/w + \psi) + b)$, by using k determined according to the light intensity of the output optical signal and arbitrary constants b, $\psi$, where w is the length of one period of the superimposed periodic phase pattern, and r is the position of the phase modulator element along the r axis in the plane in the period,
the third periodic phase pattern is such that the phase $\phi$ in one period is represented as:

$\phi = k \times (sr + b)(r \leq p)$ $\phi = k' \times (s'r + b')(r > p)$ by using k, k' determined according to the light intensity of the output optical signal and arbitrary constants b, b', s, s', p, where r is the position of the phase modulator element along the r axis in the plane in the period, and
the fourth periodic phase pattern is such that the phase $\phi$ in one period is represented as:

$\phi = b(r < p, r > q)$ $\phi = k + b(p \leq r \leq q)$ by using k determined according to the light intensity of the output optical signal and arbitrary constants b, p, q, where r is the position of the phase modulator element along the r axis in the plane in the period, and
wherein a length w of one period of the periodic phase pattern is equal to a length of an integer multiple of the pixel.

2. The optical input/output device according to claim 1, wherein
the output port or the input port includes N ports, and the driver unit changes a phase $\phi$ (y) along a y axis of the signal light thereby to provide optical coupling to each output port for each exit angle or for each entry angle, when the y axis is an axis in the plane of the phase modulator element corresponding to a direction of arrangement of the plurality of output ports or the plurality of input ports,
the periodic phase pattern has periodicity such that a length of one period is w in a direction of the y axis, and when an angle $\theta$ formed by outgoing light and incoming light as the signal light exiting and entering, respectively, during the optical coupling between the input port and the output port is $\theta i$ (i=1 to N), $\lambda$ is a wavelength of the input signal light, m is an integer other than zero, and $\Delta\theta s=\arctan(\lambda/w)$, an angle formed by the exit angle of the outgoing light to the output port and the entry angle of the signal light entering from the input port is not set in a direction of $\theta i+ m\times\Delta\theta s$.

3. The optical input/output device according to claim 1, wherein the output port or the input port includes a plurality of ports, and the driver unit changes a phase $\phi$ (y) along a y axis of the signal light thereby to provide coupling between each input port and each output port, when the y axis is an axis in the plane of the phase modulator element corresponding to a direction of arrangement of the plurality of output ports or the plurality of input ports, and the superimposing means superimposes a periodic phase pattern having periodicity in a direction other than the y axis.

4. The optical input/output device according to claim 1, wherein the superimposing means divides a plane region which the signal light enters in the plane of the phase modulator element into two or more regions, and superimposes phase patterns having different periodicities on the regions.

5. The optical input/output device according to claim 1, wherein a length w of one period of the periodic phase pattern varies according to a position of the input port or the output port for the optical coupling.

6. An optical input/output device comprising:
an input port and an output port configured to input and output signal light, respectively;
a phase modulator element including a plurality of pixels arranged in a matrix in a plane,
a pattern generator unit configured to generate a phase pattern which is a combination of phase values set for each pixel to provide optical coupling to a desired port out of the output port,
a control unit configured to convert the phase pattern into a driving signal for each pixel,
a driver unit configured to drive the pixel according to the driving signal, the phase modulator element being configured to change an optical phase of the signal light entering each pixel, by the driver unit applying the driving signal corresponding to the phase pattern; and
an optical element configured to convert a direction of exit of the signal light so as to irradiate each pixel in the plane of the phase modulator element with the signal light exiting from the input port to a space,
wherein the pattern generator unit includes superimposing means for superimposing a periodic phase pattern having a predetermined period in at least one direction in the plane of the phase modulator element which the signal light enters, and means for controlling an amplitude of the periodic phase pattern,
wherein the signal light is diffracted to a position according to the period and pattern shape of the periodic phase pattern superimposed on the phase pattern capable of providing desired optical coupling between the input port and the output port, so that light intensity of the signal light is dispersed,
wherein the output port or the input port includes a plurality of ports, and the driver unit changes a phase $\phi$ (y) along a y axis of the signal light thereby to provide optical coupling between each input port and each output port, when the y axis is an axis in the plane of the phase modulator element corresponding to a direction of arrangement of the plurality of output ports or the plurality of input ports, and the superimposing means superimposes a periodic phase pattern having periodicity in a direction of the y axis, in which a length w of one period of the pattern is represented as $w<\lambda/\tan(\phi_{max}-\phi_{min})$, when a maximum value and a minimum value of an angle $\theta$ formed by outgoing light and incoming light during the coupling between the input port and the output port are $\theta$max and $\theta$min, respectively, and $\lambda$ is a wavelength of the input signal light, wherein the superimposing means controls light power by superimposing two different periods of at least two periodic phase patterns selected from a first periodic phase pattern, a second periodic phase pattern, a third periodic phase pattern, and a fourth periodic phase pattern, the first periodic phase pattern is such that a phase $\phi$ in one period is represented as $\phi=k\times(r/w+b)$, by using k determined according to the light intensity of an output optical signal and an arbitrary constant b, where w is a length of one period of the superimposed periodic phase pattern, and r is the position of the phase modulator element along an r axis in the plane in the period, the second periodic phase pattern is such that the phase $\phi$ in one period is represented as $\phi=k\times(\sin(2\pi\cdot r/w\psi)+b)$, by using k determined according to the light intensity of the output optical signal and arbitrary constants b, $\psi$, where w is the length of one period of the superimposed periodic phase pattern, and r is the position of the phase modulator element along the r axis in the plane in the period, the third periodic phase pattern is such that the phase $\phi$ in one period is represented as:

$\phi=k\times(sr+b)(\ r\leq p)$ $\phi=k'\times(s'r+b')(\ r>p)$ by using k, k' determined according to the light intensity of the output optical signal and arbitrary constants b, b', s, s', p, where r is the position of the phase modulator element along the r axis in the plane in the period, and the fourth periodic phase pattern is such that the phase $\phi$ in one period is represented as:

$\phi=b(r<p,\ r>q)$ $\phi=k+b(p\leq r\leq q)$ by using k determined according to the light intensity of the output optical signal and arbitrary constants b, p, q, where r is the position of the phase modulator element along the r axis in the plane in the period, and a length w of one period of the periodic phase pattern is equal to a length of an integer multiple of the pixel.

* * * * *